United States Patent
Shijo et al.

(10) Patent No.: US 10,836,261 B2
(45) Date of Patent: Nov. 17, 2020

(54) INDUCTOR UNIT, WIRELESS POWER TRANSMISSION DEVICE, AND ELECTRIC VEHICLE

(71) Applicant: KABUSHIKI KAISHA TOSHIBA, Tokyo (JP)

(72) Inventors: Tetsu Shijo, Tokyo (JP); Kenichirou Ogawa, Kanagawa (JP); Akiko Yamada, Kanagawa (JP); Noriaki Oodachi, Kanagawa (JP); Shuichi Obayashi, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 15/264,186

(22) Filed: Sep. 13, 2016

(65) Prior Publication Data
US 2017/0012477 A1 Jan. 12, 2017

Related U.S. Application Data

(63) Continuation of application No. PCT/JP2014/065701, filed on Jun. 13, 2014.

(51) Int. Cl.
*H02J 50/12* (2016.01)
*H01F 27/24* (2006.01)
(Continued)

(52) U.S. Cl.
CPC ............ *B60L 5/005* (2013.01); *B60L 53/122* (2019.02); *B60L 53/38* (2019.02); *H01F 27/24* (2013.01);
(Continued)

(58) Field of Classification Search
CPC ............ H02J 5/005; H02J 7/025; H01F 38/14
See application file for complete search history.

(56) References Cited

U.S. PATENT DOCUMENTS 8,354,822 B2   1/2013  Suzuki
8,508,184 B2   8/2013  Sakakibara et al.
(Continued)

FOREIGN PATENT DOCUMENTS

JP   2011-125178   6/2011
JP   2011-147213   7/2011
(Continued)

OTHER PUBLICATIONS

International Search Report issued by the Japanese Patent Office in International Application No. PCT/JP2014/065701, dated Sep. 9, 2014 (7 pages).
(Continued)

*Primary Examiner* — Rexford N Barnie
*Assistant Examiner* — Terrence R Willoughby
(74) *Attorney, Agent, or Firm* — Finnegan, Henderson, Farabow, Garrett & Dunner, L.L.P.

(57) ABSTRACT

An inductor unit according to one embodiment includes a first inductor comprising a first core and a first winding wound around the first core; and a second inductor comprising a second core and a second winding wound around the second core. The first inductor and the second inductor are disposed so that an angle is larger than 0 degree and smaller than 90 degrees. The angle is formed by: a first straight line coupling a first intersection point of a first center line in parallel with a first magnetic flux direction of the first core and a second center line perpendicular to the first magnetic flux direction, and a second intersection point of a third center line in parallel with the second magnetic flux direction of the second core and a fourth center line perpendicular to the second magnetic flux direction; and the first center line.

18 Claims, 21 Drawing Sheets

(51) Int. Cl.
*B60L 5/00* (2006.01)
*H01F 38/14* (2006.01)
*H02J 50/70* (2016.01)
*B60L 53/38* (2019.01)
*B60L 53/122* (2019.01)
*H01F 27/28* (2006.01)

(52) U.S. Cl.
CPC ............ *H01F 27/28* (2013.01); *H01F 38/14* (2013.01); *H02J 50/12* (2016.02); *H02J 50/70* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | | |
|---|---|---|---|---|
| 9,318,258 | B2* | 4/2016 | Yamakawa | H01F 38/14 |
| 9,331,518 | B2* | 5/2016 | Walley | H02J 5/005 |
| 9,421,877 | B2 | 8/2016 | Ichikawa et al. | |
| 2007/0035184 | A1* | 2/2007 | Sakiya | H02K 41/03 310/12.22 |
| 2009/0315555 | A1* | 12/2009 | Heger | G01R 15/148 324/260 |
| 2010/0264747 | A1 | 10/2010 | Hall et al. | |
| 2012/0161544 | A1 | 6/2012 | Kashiwagi et al. | |
| 2012/0169139 | A1 | 7/2012 | Kudo | |
| 2013/0009462 | A1 | 1/2013 | Amano et al. | |
| 2013/0249299 | A1 | 9/2013 | Shijo et al. | |
| 2014/0008974 | A1* | 1/2014 | Miyamoto | H02J 50/90 307/11 |
| 2014/0124994 | A1* | 5/2014 | May | F16F 9/04 267/64.27 |
| 2016/0221461 | A1 | 8/2016 | Obayashi et al. | |
| 2016/0329752 | A1* | 11/2016 | Bae | H02J 50/40 |

FOREIGN PATENT DOCUMENTS

| | | |
|---|---|---|
| JP | 2011-200052 | 10/2011 |
| JP | 2011-234496 | 11/2011 |
| JP | 2013-523066 | 6/2013 |
| JP | 2013-201867 | 10/2013 |
| JP | 2013-207238 | 10/2013 |
| JP | 2014-0011332 * | 1/2014 |
| JP | 2014-11332 | 1/2014 |
| JP | 2014-39369 | 2/2014 |
| JP | 2015-77027 | 4/2015 |
| WO | WO 2011/077488 A1 | 6/2011 |
| WO | WO 2011/077493 A1 | 6/2011 |
| WO | WO 2013/172336 A1 | 11/2013 |
| WO | WO 2014/119297 A1 | 8/2014 |
| WO | WO 2015/037690 A1 | 3/2015 |

OTHER PUBLICATIONS

International Preliminary Report on Patentabiiity dated Dec. 22, 2016, issued by The International Bureau of WIPO in International Application No. PCT/JP2014/065701; 2 pages.

Written Opinion dated Sep. 9, 2014, issued by Japanese Patent Office in International Application No. PCT/JP2014/065701; 8 pages.

* cited by examiner

INDUCTOR UNIT, WIRELESS POWER TRANSMISSION DEVICE, AND ELECTRIC VEHICLE

CROSS REFERENCE TO RELATED APPLICATION

This application is a Continuation of International Application No. PCT/JP2014/065701, filed on Jun. 13, 2014, the entire contents of which is hereby incorporated by reference.

FIELD

Embodiments described herein relate to an inductor unit, a wireless power transmission device, and an electric vehicle.

BACKGROUND

In late years, a device having an inductor unit including a plurality of inductors has been proposed as a wireless power transmission device for transmitting large power wirelessly to an electric bus or the like. Such a device is capable of increasing heat releasing performance from the inductors and decreasing a withstand voltage or current capacity required for each inductor, and thus is suitable for transmission of high power.

However, in this device, problems such as decrease of transmission efficiency and complicated power control occur due to magnetic coupling of the plurality of inductors constituting the inductor unit. Further, an inductor unit has been proposed in which the angle formed by a magnetic flux direction of each inductor is vertical in order to suppress magnetic coupling of the plurality of inductors. This inductor unit has, however, a problem that reduction of leakage magnetic field is difficult. Thus, conventional inductor units have not been able to achieve decrease of coupling coefficient and reduction of leakage magnetic field at the same time.

DETAILED DESCRIPTION

There are provided an inductor unit having a plurality of inductors and a small coupling coefficient between inductors, a wireless power transmission device, and an electric vehicle.

An inductor unit according to one embodiment includes a first inductor comprising a first core and a first winding wound around the first core; and a second inductor comprising a second core and a second winding wound around the second core. The first inductor and the second inductor are disposed so that an angle is larger than 0 degree and smaller than 90 degrees. The angle is formed by: a first straight line coupling a first intersection point of a first center line in parallel with a first magnetic flux direction of the first core and a second center line perpendicular to the first magnetic flux direction, and a second intersection point of a third center line in parallel with the second magnetic flux direction of the second core and a fourth center line perpendicular to the second magnetic flux direction; and the first center line.

Hereinafter, embodiments of the present invention will be explained with reference to the drawings.

First Embodiment

First, an inductor unit according to a first embodiment will be explained with reference to FIG. 1 to FIG. 16. The inductor unit according to this embodiment has a plurality of inductors. Each inductor of the inductor unit 100 is connected to a capacitor and forms a resonance circuit. This resonance circuit is used as a power transmitter or a power receiver of a wireless power transmission device.

Figure 1:
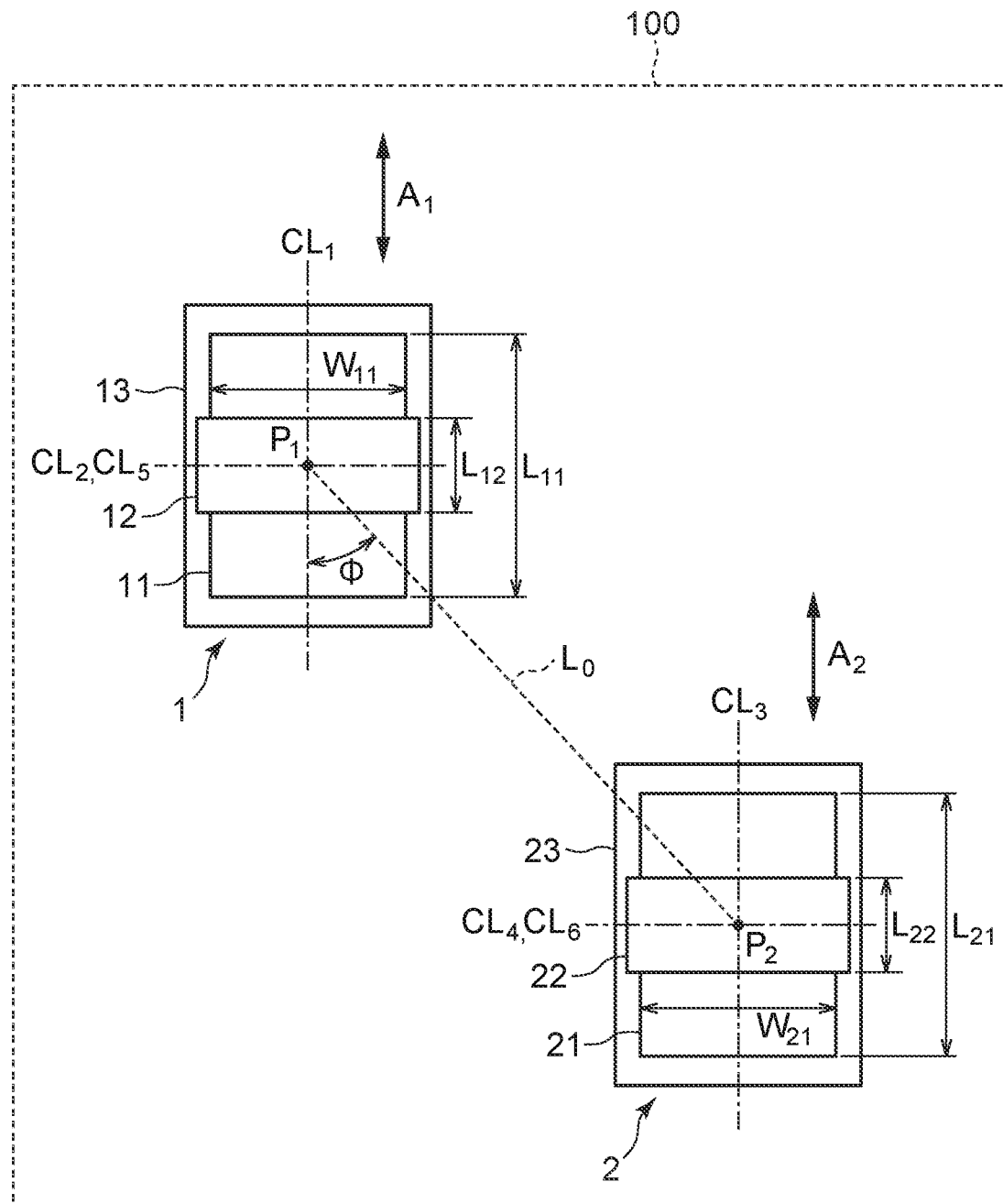
FIG. 1 is a plan view illustrating a schematic structure of an inductor unit according to a first embodiment.

Here, FIG. 1 is a plan view illustrating a schematic structure of the inductor unit 100 according to this embodiment. As illustrated in FIG. 1, the inductor unit 100 has an inductor 1 and an inductor 2.

The inductor 1 (first inductor) is a solenoid-type inductor. The inductor 1 is connected in series or parallel with a capacitor to form a resonance circuit. This capacitor may be included in the inductor unit 100 or may be included in a different circuit from the inductor unit 100. The inductor 1 couples with another inductor disposed opposite thereto through electromagnetic induction or magnetic field resonance (sympathetic vibration). Thus, wireless power transmission with the other inductor is achieved. The inductor 1 includes a core 11, a winding 12, and a case 13.

The core 11 (first core) is formed of a magnetic substance such as ferrite. The winding 12 (first winding) is wound around the core 11. Applying current through the winding 12 generates a magnetic field. Hereinafter, the direction of a magnetic field generated in the core 11 during operation of the inductor unit 100 will be referred to as a magnetic flux direction $A_1$ (first magnetic flux direction) of the core 11. The magnetic flux direction $A_1$ is a direction of an arrow $A_1$ in FIG. 1. Further, the dimension in the magnetic flux direction $A_1$ of the core 11 will be referred to as a core length $L_{11}$, and the dimension in a direction perpendicular to the magnetic flux direction $A_1$ of the core 11 will be referred to as a core width $W_{11}$. The core length $L_{11}$ and the core width $W_{11}$ can be designed in any dimensions.

Further, a center line of the core 11 in parallel with the magnetic flux direction $A_1$ will be referred to as a center line $CL_1$ (first center line), and a center line of the core 11 perpendicular to the magnetic flux direction $A_1$ will be referred to as a center line $CL_2$ (second center line). That is, the center line $CL_1$ is a straight line passing through the center of the core width $W_{11}$ of the core 11 and in parallel with the magnetic flux direction $A_1$, and the center line $CL_2$ is a straight line passing through the center of the core length $L_{11}$ of the core 11 and perpendicular to the magnetic flux direction $A_1$. As illustrated in FIG. 1, the center line $CL_1$ and the center line $CL_2$ cross each other at an intersection point $P_1$ (first intersection point).

Figure 2:
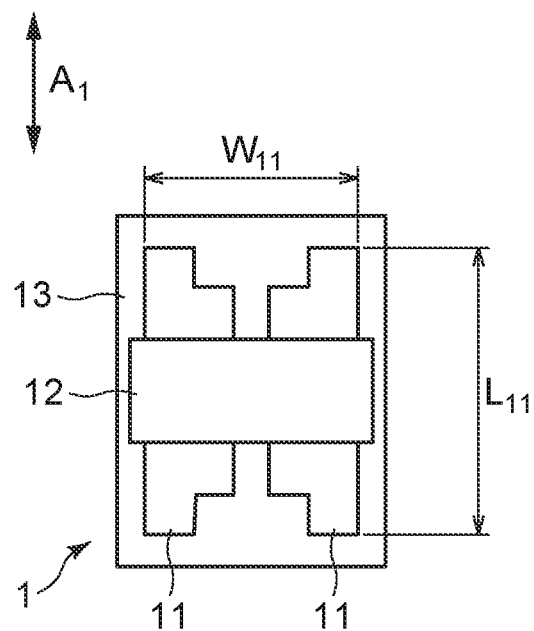
FIG. 2 is a plan view illustrating a modification example of an inductor.

Note that in FIG. 1, a plan view shape of the core 11 is a rectangle longer in the core length $L_{11}$ than in the core width $W_{11}$, but the core 11 may be divided and need not be a rectangle, as illustrated in FIG. 2. When the core 11 is divided or is not a rectangle, dimensions of respective sides of a rectangular shape in which an outer periphery of the core 11 fits become the core length $L_{11}$ and the core width $W_{11}$. In any case, the maximum dimension in the magnetic flux direction $A_1$ of the core 11 will be called the core length $L_{11}$, and the maximum dimension in a direction perpendicular to the magnetic flux direction $A_1$ of the core 11 will be called the core width $W_{11}$.

As the magnetic-flux-direction winding 12, for example, a copper wire, an aluminum wire, and a litz wire and the like are used. Hereinafter, the dimension in the magnetic flux direction $A_1$ of the winding 12 will be referred to as a winding length $L_{12}$. The winding length $L_{12}$ can be designed in any dimensions.

Figure 3:
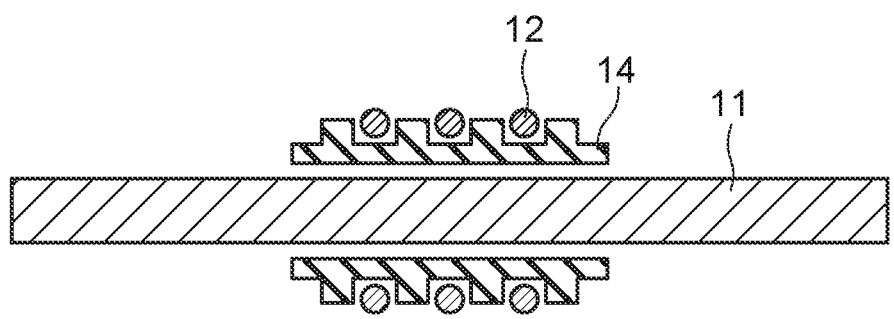
FIG. 3 is a cross-sectional view illustrating a modification example of the inductor.

Further, a center line of the winding 12 perpendicular to the magnetic flux direction $A_1$ will be referred to as a center line $CL_5$ (fifth center line). In FIG. 1, the winding 12 is disposed in a center portion of the core 11 so that the center line $CL_2$ and the center line $CL_5$ coincide. Here, FIG. 3 is a cross-sectional view taken along the center line $CL_1$ of the inductor 1. The winding 12 may be wound around the core 11 via a bobbin 14 of a dielectric substance, as illustrated in FIG. 3.

The case 13 is formed of a dielectric substance. In FIG. 1, only an outer shape of the case 13 is illustrated, and thus the core 11 and the winding 12 are exposed through the surface. The case 13 is, in fact, formed to cover the entire bodies of the core 11 and the winding 12.

The inductor 2 (second inductor) is a solenoid-type inductor. The inductor 2 is connected in series with a capacitor to form a resonance circuit. This capacitor may be included in the inductor unit 100 or may be included in a different circuit from the inductor unit 100. The inductor 2 couples with another inductor disposed opposite thereto through magnetic field resonance (sympathetic vibration). Thus, wireless power transmission with the other inductor is achieved. The inductor 2 includes a core 21, a winding 22, and a case 23.

The core 21 (second core) is formed of a magnetic substance such as ferrite. The winding 22 (second winding) is wound around the core 21. Applying current through the winding 22 generates a magnetic field. Hereinafter, the direction of a magnetic field generated in the core 21 during operation of the inductor unit 100 will be referred to as a magnetic flux direction $A_2$ (second magnetic flux direction) of the core 21. The magnetic flux direction $A_2$ is a direction of an arrow $A_2$ in FIG. 1. Further, the dimension in the magnetic flux direction $A_2$ of the core 21 will be referred to as a core length $L_{21}$, and the dimension in a direction perpendicular to the magnetic flux direction $A_2$ of the core 21 will be referred to as a core width $W_{21}$. The core length $L_{21}$ and the core width $W_{21}$ can be designed in any dimensions.

Further, a center line of the core 21 in parallel with the magnetic flux direction $A_2$ will be referred to as a center line $CL_3$ (third center line), and a center line of the core 21 perpendicular to the magnetic flux direction $A_2$ will be referred to as a center line $CL_4$ (fourth center line). That is, the center line $CL_3$ is a straight line passing through the center of the core width $W_{21}$ of the core 21 and in parallel with the magnetic flux direction $A_2$, and the center line $CL_4$ is a straight line passing through the center of the core length $L_{21}$ of the core 21 and perpendicular to the magnetic flux direction $A_2$. As illustrated in FIG. 1, the center line $CL_3$ and the center line $CL_4$ cross each other at an intersection point $P_2$ (second intersection point).

Figure 4:
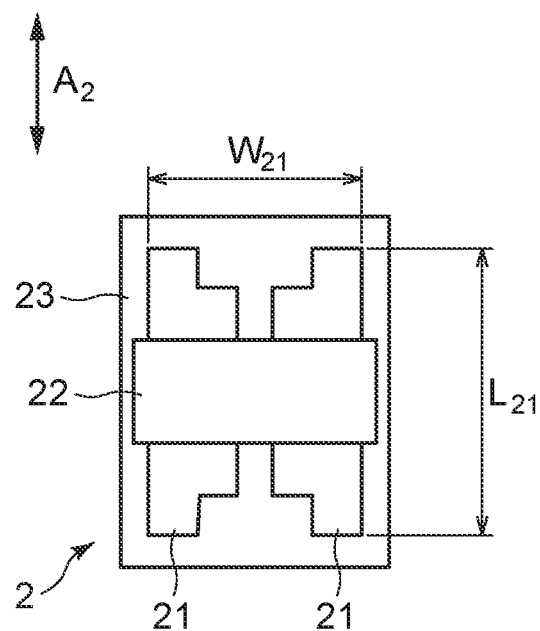
FIG. 4 is a cross-sectional view illustrating a modification example of the inductor.

Note that in FIG. 1, a plan view shape of the core 21 is a rectangle longer in the core length $L_{21}$ than in the core width $W_{21}$, but the core 21 may be divided and need not be a rectangle, as illustrated in FIG. 4. In any case, the maximum dimension in the magnetic flux direction $A_2$ of the core 21 will be called the core length $L_{21}$, and the maximum dimension in a direction perpendicular to the magnetic flux direction $A_2$ of the core 21 will be called the core width $W_{21}$.

As the winding 22, for example, a copper wire, an aluminum wire, and a litz wire and the like are used. Hereinafter, the dimension in the magnetic flux direction $A_2$ of the winding 22 will be referred to as a winding length $L_{22}$. The winding length $L_{22}$ can be designed in any dimensions.

Further, a center line of the winding 22 perpendicular to the magnetic flux direction $A_2$ will be referred to as a center line $CL_6$ (sixth center line). In FIG. 1, the winding 22 is disposed in a center portion of the core 21 so that the center line $CL_4$ and the center line $CL_6$ coincide. Note that the winding 22 may be wound around the core 21 via a bobbin of a dielectric substance.

The case 23 is formed of a dielectric substance. In FIG. 1, only an outer shape of the case 23 is illustrated, and thus the core 21 and the winding 22 are exposed through the surface. The case 23 is, in fact, formed to cover the entire bodies of the core 21 and the winding 22.

The inductor unit 1 and the inductor unit 2 described above are disposed on the same plane so that the magnetic flux direction $A_1$ and the magnetic flux direction $A_2$ are in parallel, as illustrated in FIG. 1. Further, the inductor unit 1 and the inductor unit 2 are disposed so that an angle $\phi$ formed by the straight line $L_0$ and the center line $CL_1$ is larger than 0 degree and smaller than 90 degrees. The straight line $L_0$ (first straight line) is a straight line coupling the intersection point $P_1$ of the inductor 1 and the intersection point $P_2$ of the inductor 2. By such arrangement, a coupling coefficient of the inductor 1 and the inductor 2 can be decreased.

In the inductor 1 and the inductor 2, particularly when the angle $\phi$ is 50 degrees or more and 70 degrees or less, an angle at which the coupling coefficient becomes 0 exists at the point where the coupling coefficient changes from a positive side to a negative side. Thus, the absolute value of the coupling coefficient in this angle range becomes smaller than in other angle ranges. Thus, the inductor 1 and the inductor 2 are preferred to be disposed so that the angle $\phi$ is 50 degrees or more and 70 degrees or less. Such arrangement can decrease the coupling coefficient more effectively. Note that decrease of the coupling coefficient means decrease in absolute value of the coupling coefficient.

Next, operation of the inductor unit 100 according to this embodiment will be explained. Hereinafter, the inductor unit 100 on the power transmission side and the inductor unit 100' on the power reception side are provided. Here, FIG. 5 is a view seeing the two systems of the inductor units 100, 100' provided on the power transmission side and the power reception side, respectively, from a side.

Figure 5:
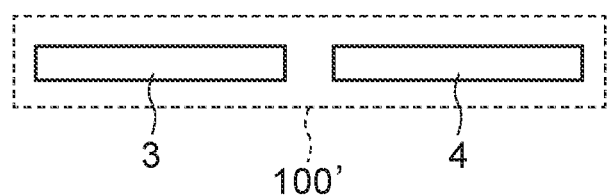
FIG. 5 is an explanatory view explaining operation of inductor units.
Figure 5:
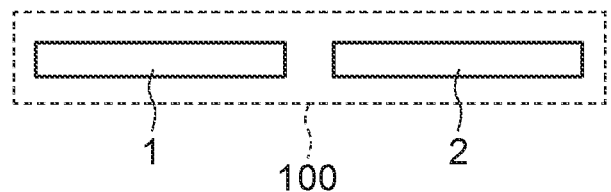

In FIG. 5, the inductor 1 of the inductor unit 100 on the power transmission side couples to the inductor 3 of the inductor unit 100' on the power reception side which is disposed opposite thereto, thereby transmitting power. Further, the inductor 2 of the inductor unit 100 on the power transmission side couples to the inductor 4 of the inductor unit 100' on the power reception side which is disposed opposite thereto, thereby transmitting power.

When the inductor unit 100 is disposed in this manner, coupling of the inductors 1, 2, coupling of the inductors 3, 4, coupling of the inductors 1, 4, and coupling of the inductors 2, 3 occur besides the above-described coupling. These couplings interfere with power transmission by the couplings of the inductors 1, 3 and the inductors 2, 4. Hereinafter, the coupling coefficient of coupling of two inductors $\alpha$, $\beta$ will be expressed as $k\alpha\beta$.

Figure 6:
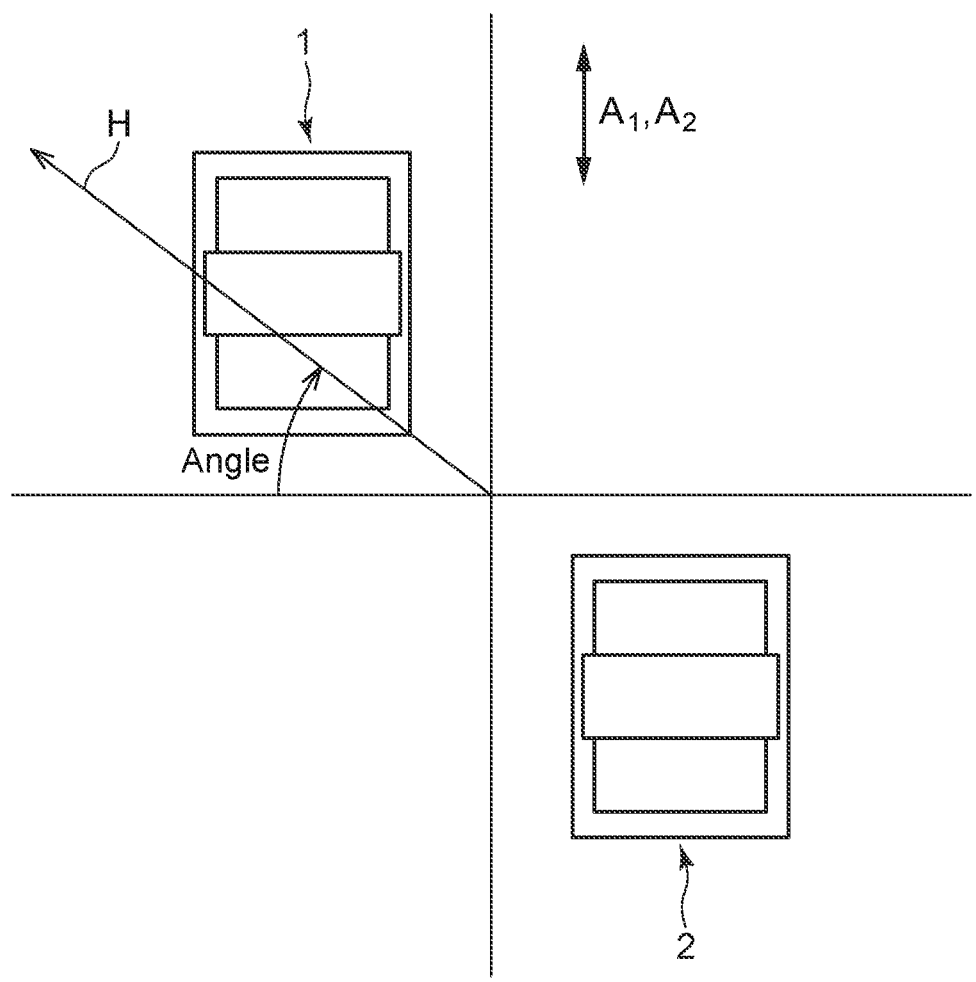
FIG. 6 is an explanatory view explaining an angle Angle.

Further, as illustrated in FIG. 6, an angle formed by a width direction (perpendicular to the magnetic directions A1, A2) of the inductor unit 100 and a direction of the leakage magnetic field H (direction of arrow H) will be expressed as an angle Angle.

Figure 7:
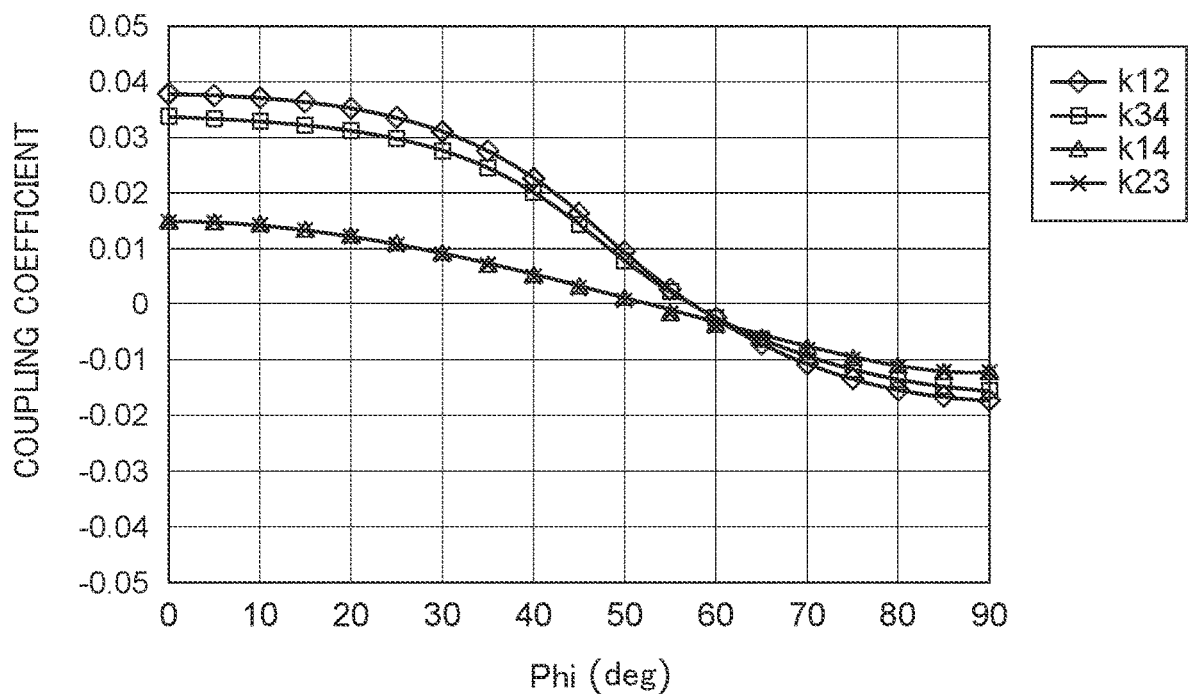
FIG. 7 is a graph illustrating the relationship between a coupling coefficient and an angle φ in the inductor unit of FIG. 1.

Here, FIG. 7 to FIG. 10 are graphs each illustrating the relationship between the coupling coefficient of the inductor unit 100 and the angle $\phi$ (Phi). FIG. 7 is a graph of coupling coefficients k13, k34, k14, and k23 when the core lengths $L_{11}$, $L_{21}$ are 550 mm, the core widths $W_{11}$, $W_{21}$ are 350 mm, and the winding lengths $L_{12}$, $L_{22}$ are 50 mm. These coupling coefficients are preferred to be small because of the above-described interference with power transmission.

As illustrated in FIG. 7, in the inductor unit 100, the coupling coefficients k13, k34, k14, and k23 all decrease as the angle $\phi$ increases from 0 degree and are 0 when the angle $\phi$ is approximately 50 to 70 degrees. Hereinafter, the angle of the angle $\phi$ at which the coupling coefficient becomes 0 is called a zero point. When the angle $\phi$ exceeds the 0 point, a negative coupling coefficient becomes large.

Figure 8:
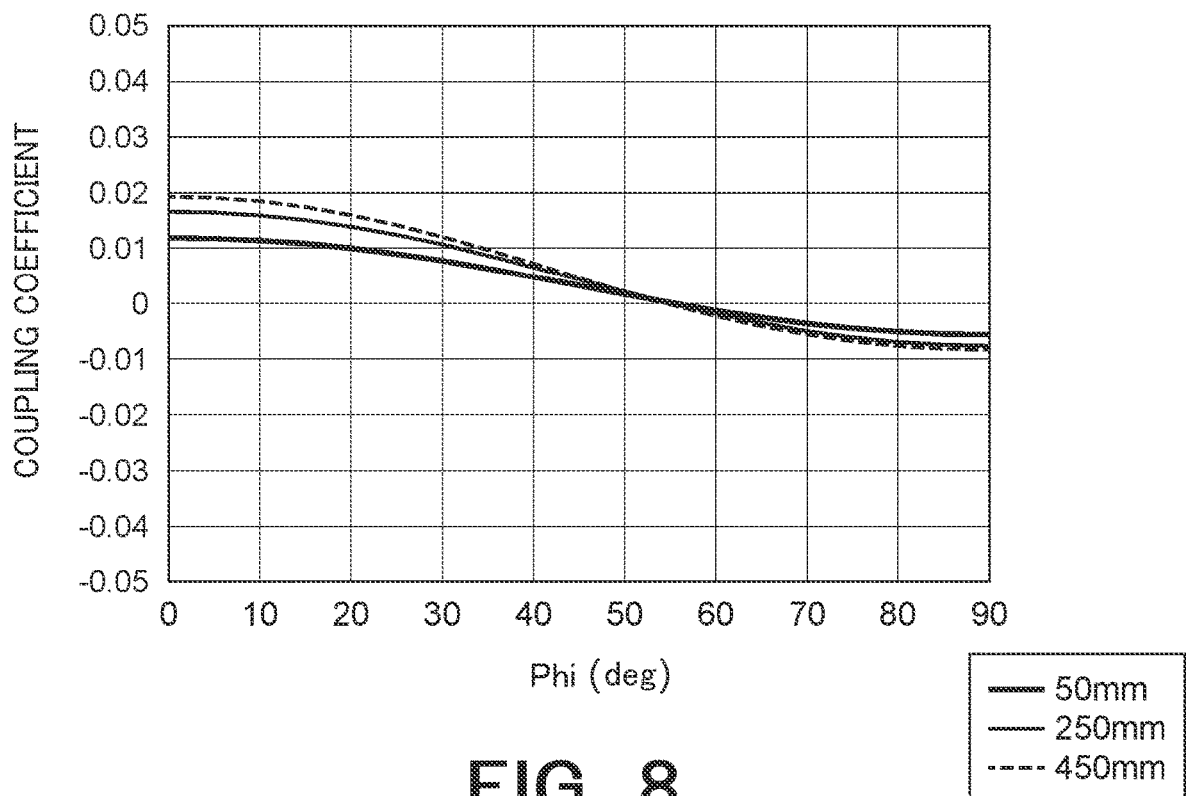
FIG. 8 is a graph illustrating the relationship between the coupling coefficient and the angle φ in the inductor unit of FIG. 1.

FIG. 8 is a graph of the coupling coefficient k12 when the core lengths $L_{11}$, $L_{21}$ are 550 mm, the core widths $W_{11}$, $W_{21}$ are 350 mm, and the winding lengths $L_{12}$, $L_{22}$ are 50, 250, 450 mm. As illustrated in FIG. 8, even when the winding lengths $L_{21}$, $L_{22}$ are changed, the coupling coefficient k12 is 0 when the angle $\phi$ is between approximately 50 to 70 degrees. That is, the zero point is included in the range of approximately 50 to 70 degrees. The same applies to the coupling coefficients k34, k14, and k23.

Figure 9:
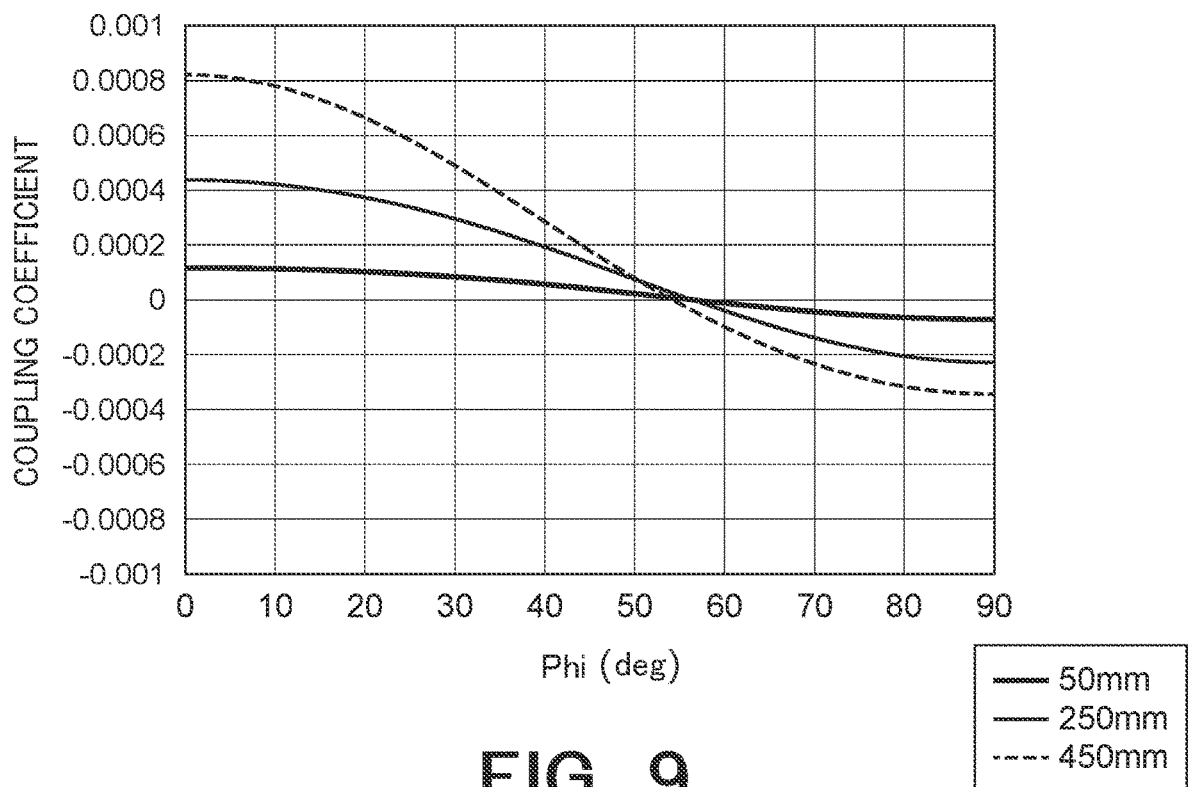
FIG. 9 is a graph illustrating the relationship between the coupling coefficient and the angle φ in the inductor unit of FIG. 1.

FIG. 9 is a graph of the coupling coefficient k12 when the core widths $W_{11}$, $W_{21}$ (widths of windings 12, 22) are 350 mm, and the winding lengths $L_{12}$, $L_{22}$ are 50, 250, 450 mm. In FIG. 9, the inductors 1, 2 do not have the cores 1, 2. As illustrated in FIG. 9, even when the inductors 1, 2 do not have the cores 1, 2, the coupling coefficient k12 is 0 when the angle $\phi$ is between approximately 50 to 70 degrees. That is, the zero point is included in the range of approximately 50 to 60 degrees. The same applies to the coupling coefficients k34, k14, and k23.

Figure 10:
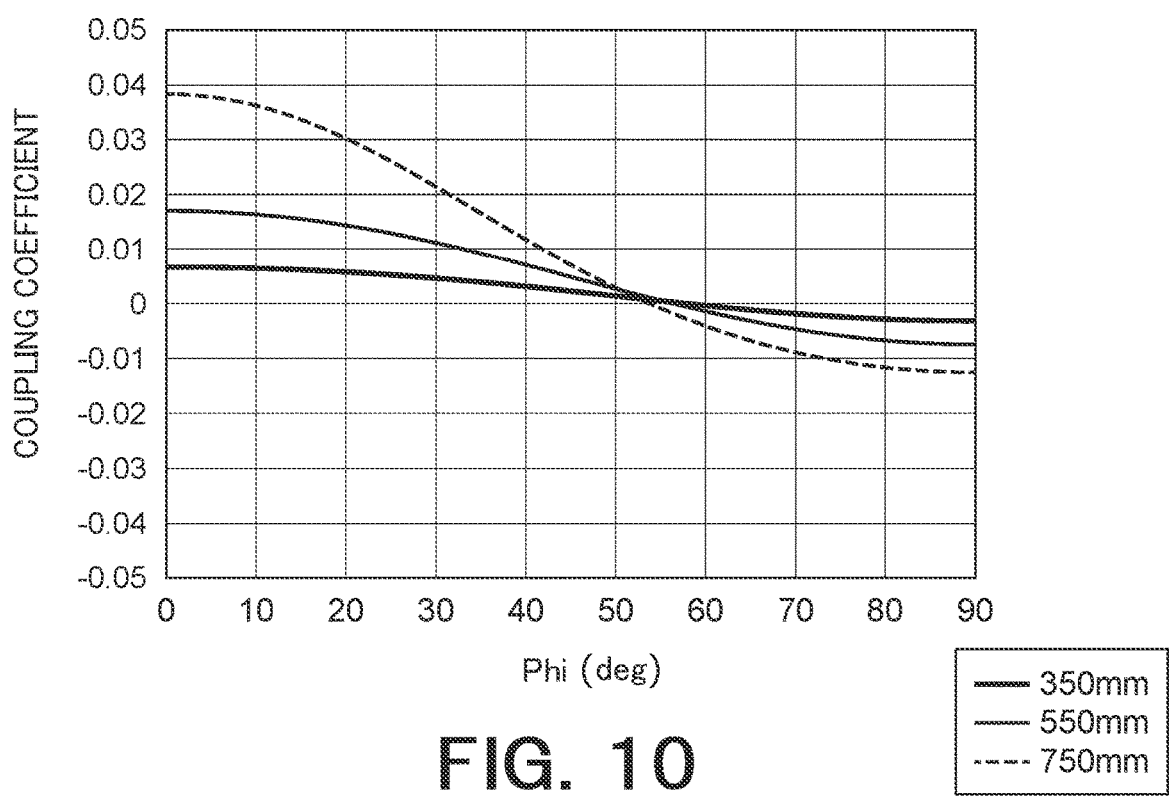
FIG. 10 is a graph illustrating the relationship between the coupling coefficient and the angle φ in the inductor unit of FIG. 1.

FIG. 10 is a graph of the coupling coefficient k12 when the core lengths $L_{11}$, $L_{21}$ are 350, 550, 750 mm, the core widths $W_{11}$, $W_{21}$ are 350 mm, and the winding lengths $L_{12}$, $L_{22}$ are 250 mm. As illustrated in FIG. 10, even when the core lengths $L_{11}$, $L_{21}$ are changed, the coupling coefficient is 0 when the angle $\phi$ is between approximately 50 to 70 degrees. That is, the zero point is included in the range of approximately 50 to 70 degrees. The same applies to the coupling coefficients k34, k14, and k23.

Thus, in the inductor unit 100, the coupling coefficient can be made 0 by setting the angle $\phi$ to a predetermined angle. This is because the coupling coefficient shifts from a positive value to a negative value in the course of change of the angle $\phi$ from 0 degree to 90 degrees.

Further, as described above, the zero point is included in the range of 50 degrees or more and 70 degrees or less regardless of the winding length, the core length, and the presence of the core. Therefore, in this inductor unit 100, it is possible to make the coupling coefficient close to 0 by setting the angle $\phi$ to an angle of 50 degrees or more and 70 degrees or less. Then, by setting the angle $\phi$ to the zero point, the coupling coefficient can be made 0.

Moreover, the inductor unit 100 can decrease the coupling coefficient while the magnetic flux directions $A_1$, $A_2$ are in parallel. Therefore, by making the magnetic fields generated by the inductors 1, 2 be in reverse phase, it is possible to reduce the leakage magnetic field H at the same time as decrease of the coupling coefficient.

Figure 11:
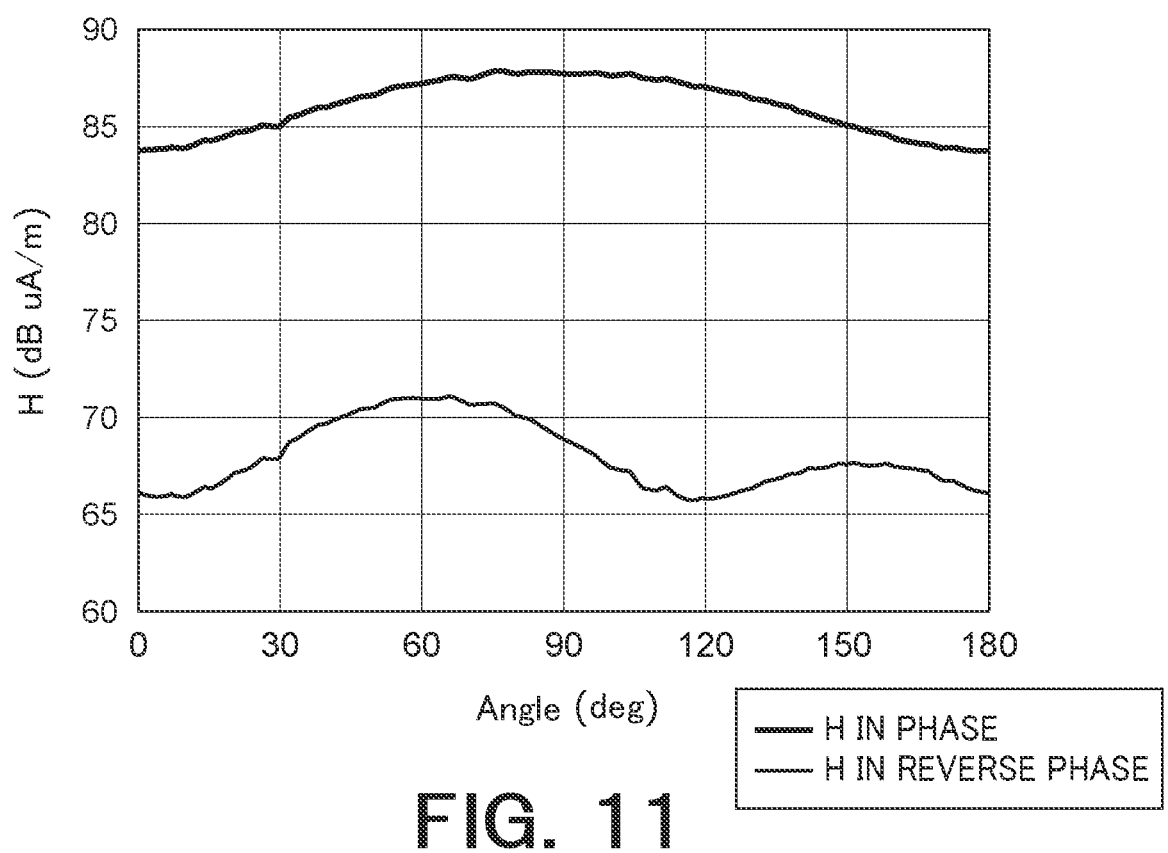
FIG. 11 is a graph illustrating the relationship between a leakage magnetic field and the angle Angle in the inductor unit of FIG. 1.

Here, FIG. 11 is a graph illustrating the relationship between the leakage magnetic field H of the inductor unit 100 and the angle Angle. In FIG. 11, H in phase represents a leakage magnetic field intensity when currents in phase are applied to the windings 12, 22, and H in reverse phase represents a leakage magnetic field intensity when currents in reverse phase are applied to the windings 12, 22. In this embodiment, the angle formed by magnetic flux directions $A_1$, $A_2$ is 0 degree or 180 degrees. As illustrated in FIG. 11, the leakage magnetic field H can be reduced by generating magnetic fields in reverse phase in the inductors 1, 2.

As explained above, in the inductor unit 100 according to this embodiment, the coupling coefficient between the inductors constituting the inductor unit 100 can be decreased, that is, made close to 0, and the leakage magnetic field H can be reduced. Further, the magnetic flux directions $A_1$, $A_2$ of the inductors 1, 2 coincide, and thus decrease of tolerance to a positional displacement can be reduced. Moreover, since the coupling coefficient of the inductors 1, 2 depends on the angle of the angle ϕ, the coupling coefficient can be made small even when the distance between the inductors 1, 2 is short. Therefore, the inductors 1, 2 can be disposed closely, so as to reduce the size of the inductor unit 100.

Note that when magnetic fields in reverse phase are generated in the inductors 1, 2, for example, the windings 12, 22 of the inductors 1, 2 may be wound in opposite directions, and currents in phase may be applied to the windings 12, 22. Alternatively, the windings 12, 22 may be wound in the same direction, and currents in reverse phase may be applied to the windings 12, 22 or currents in phase may be applied thereto in opposite directions.

Figure 12A:
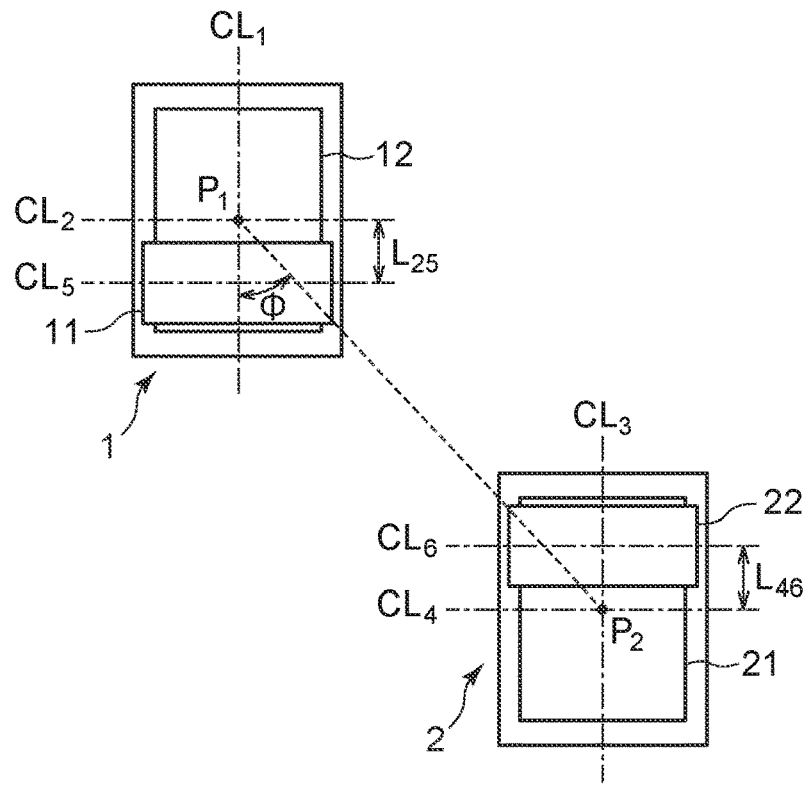
FIG. 12A is a plan view illustrating a modification example of the inductor unit of FIG. 1.

FIG. 12A is a plan view illustrating a modification example of the inductor unit 100. In the inductor unit 100 of FIG. 12A, the winding is disposed so that the center line of the winding is separated from the center line of the core. That is, the winding 12 is disposed so that the center line $CL_2$ and the center line $CL_5$ are separated by an offset distance $L_{25}$. The winding 22 is disposed so that the center line $CL_4$ and the center line $CL_6$ are separated by an offset distance $L_{46}$.

Figure 12B:
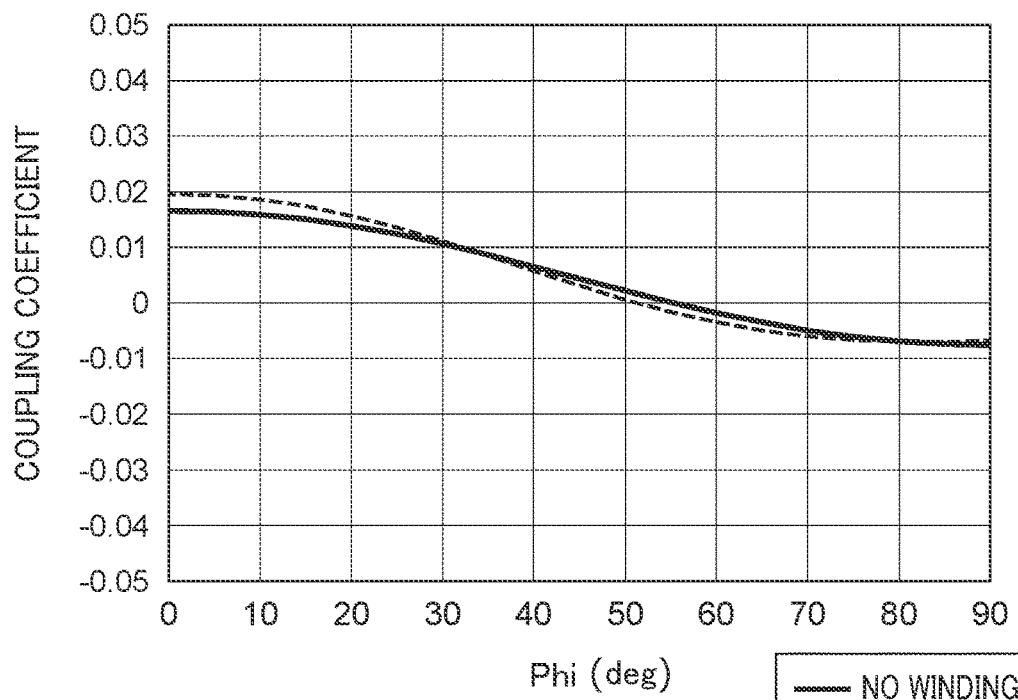
FIG. 12B is a graph illustrating the relationship between the coupling coefficient and the angle φ in the inductor unit of FIG. 12A.

FIG. 12B is a graph illustrating the relationship between the coupling coefficient and the angle ϕ in the inductor unit of FIG. 12A. More specifically, FIG. 12B is a graph when the core lengths $L_{11}$, $L_{21}$ are 550 mm, the core widths $W_{11}$, $W_{21}$ are 350 mm, the winding lengths $L_{12}$, $L_{22}$ are 250 mm, and the offset distances $L_{25}$, $L_{46}$ are 200 mm.

As illustrated in FIG. 12B, the zero point is about 55 degrees when the winding is not offset, or the zero point is 50 degrees when the winding is offset. By the position of the winding being offset relative to the core, the angle of the angle ϕ at the zero point can be varied.

Figure 13:
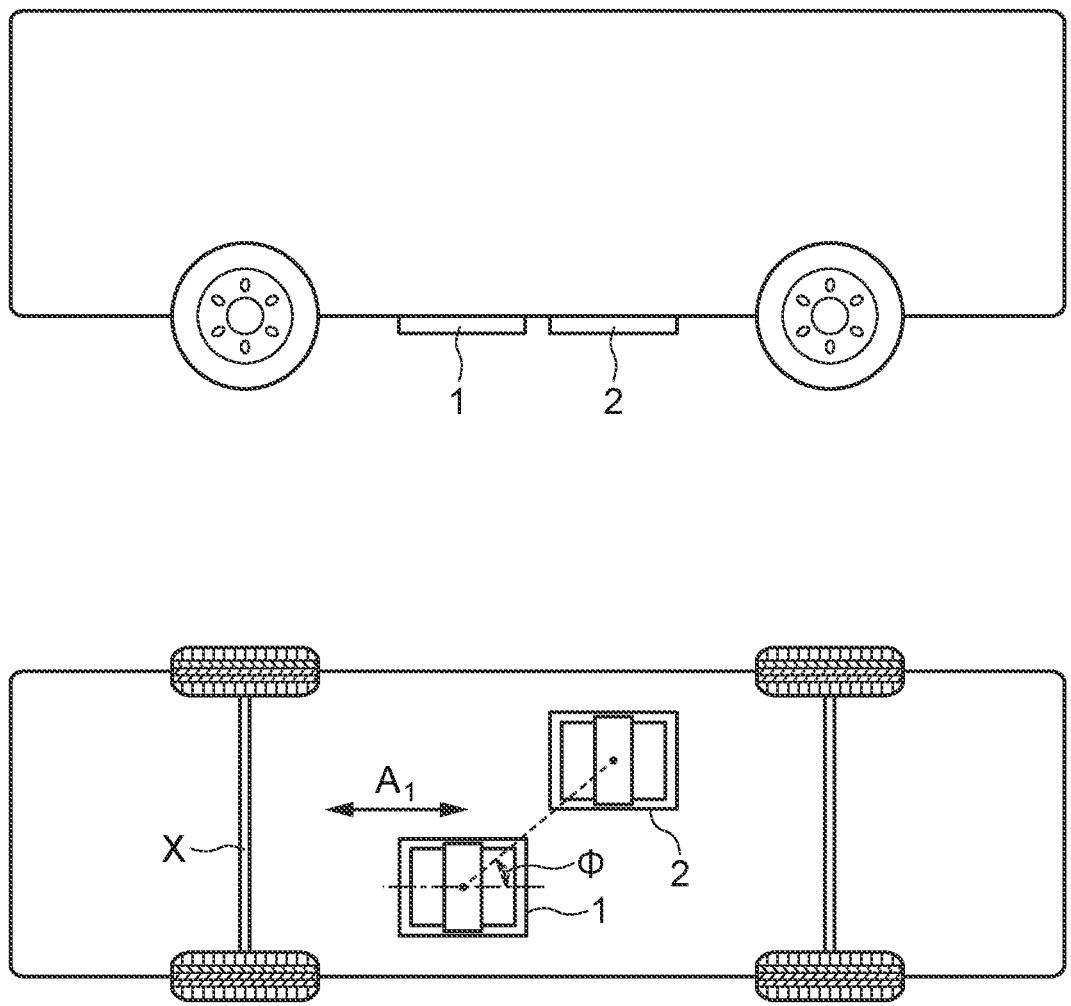
FIG. 13 is a view illustrating an example of a method for mounting the inductor unit of FIG. 1.
Figure 14:
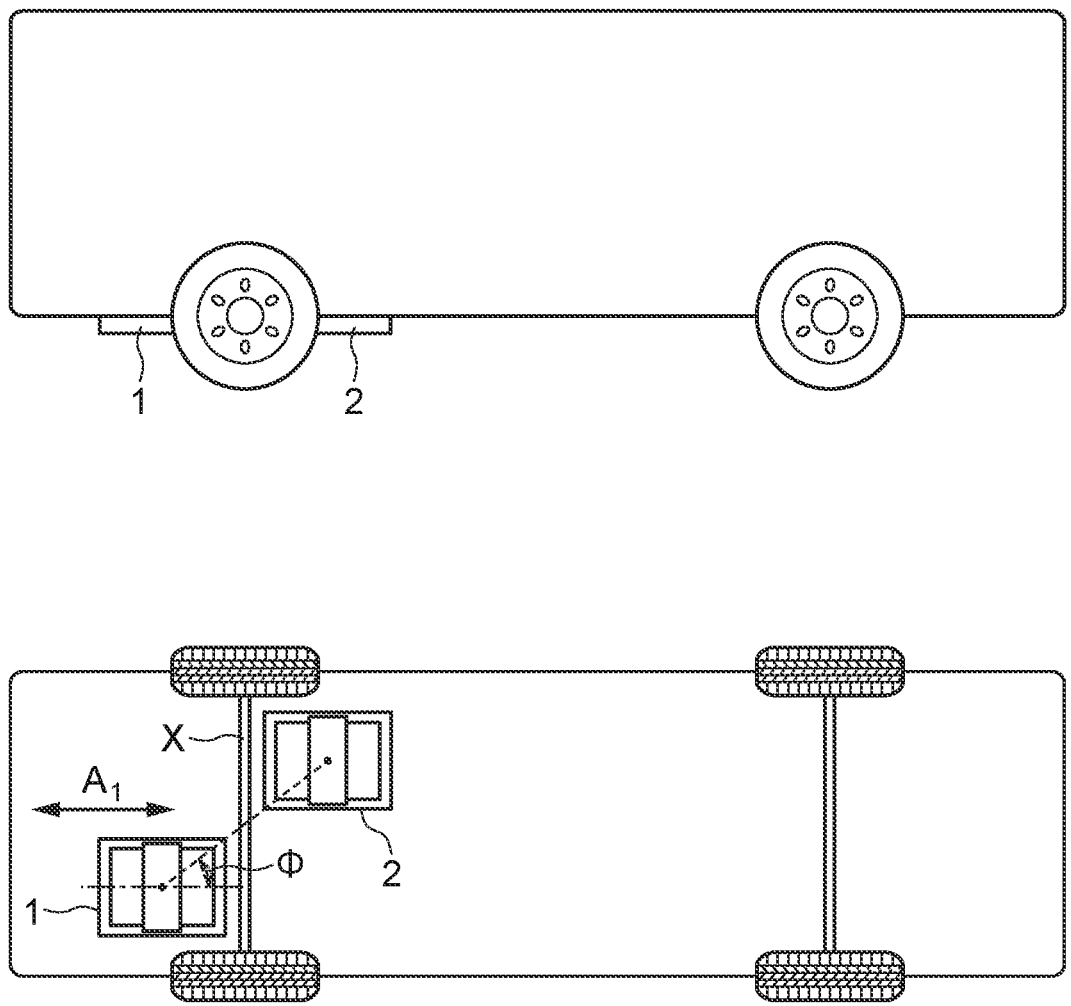
FIG. 14 is a view illustrating an example of a method for mounting the inductor unit of FIG. 1.

For example, when the inductor unit 100 is mounted as a power reception device in an electric bus, a case where the inductors 1, 2 are disposed on the same side with respect to an axle X as illustrated in FIG. 13, or a case where the inductors 1, 2 are disposed on opposite sides with respect to the axle X as illustrated in FIG. 14 are conceivable. When the inductors 1, 2 are disposed as illustrated in FIG. 13, the angle of the angle ϕ can be made large as compared to when they are disposed as in FIG. 14. This is because the distance in the magnetic flux direction $A_1$ between the inductor 1 and the inductor 2 needs to be large so that the inductors 1, 2 and the axle X which is a conductor are disposed not to overlap as in FIG. 14.

When the angle of the angle ϕ in FIG. 14 is smaller than the zero point, as described above, the coupling coefficient becomes larger than 0. In such cases, by disposing the windings 12, 22 to be offset to make the zero point small, it is possible to decrease the coupling coefficient. Note that the offset distances $L_{25}$, $L_{46}$ of the windings 12, 22 can be set to any distances.

Figure 15A:
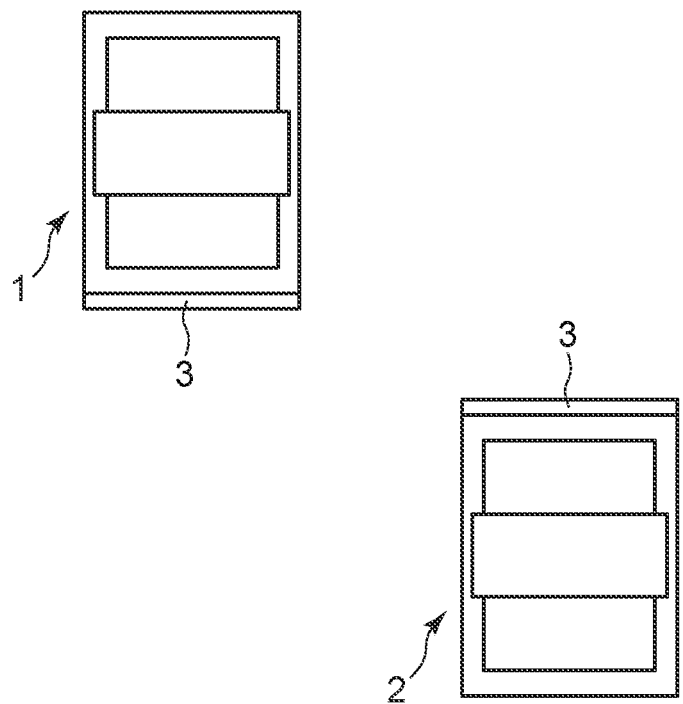
FIG. 15A is a plan view illustrating a modification example of the inductor unit of FIG. 1.

FIG. 15A is a plan view illustrating another modification example of the inductor unit 100 according to this embodiment. This inductor unit 100 has a shielding plate 3 constituted of a conductor or a magnetic substance between the inductor 1 and the inductor 2. More specifically, the shielding plate 3 is disposed so as to shield from at least part of a magnetic path formed from the inductors 1, 2. The shielding plate 3 is provided on each of the inductors 1, 2 in FIG. 15A but may also be provided on only one of the inductors 1, 2.

Figure 15B:
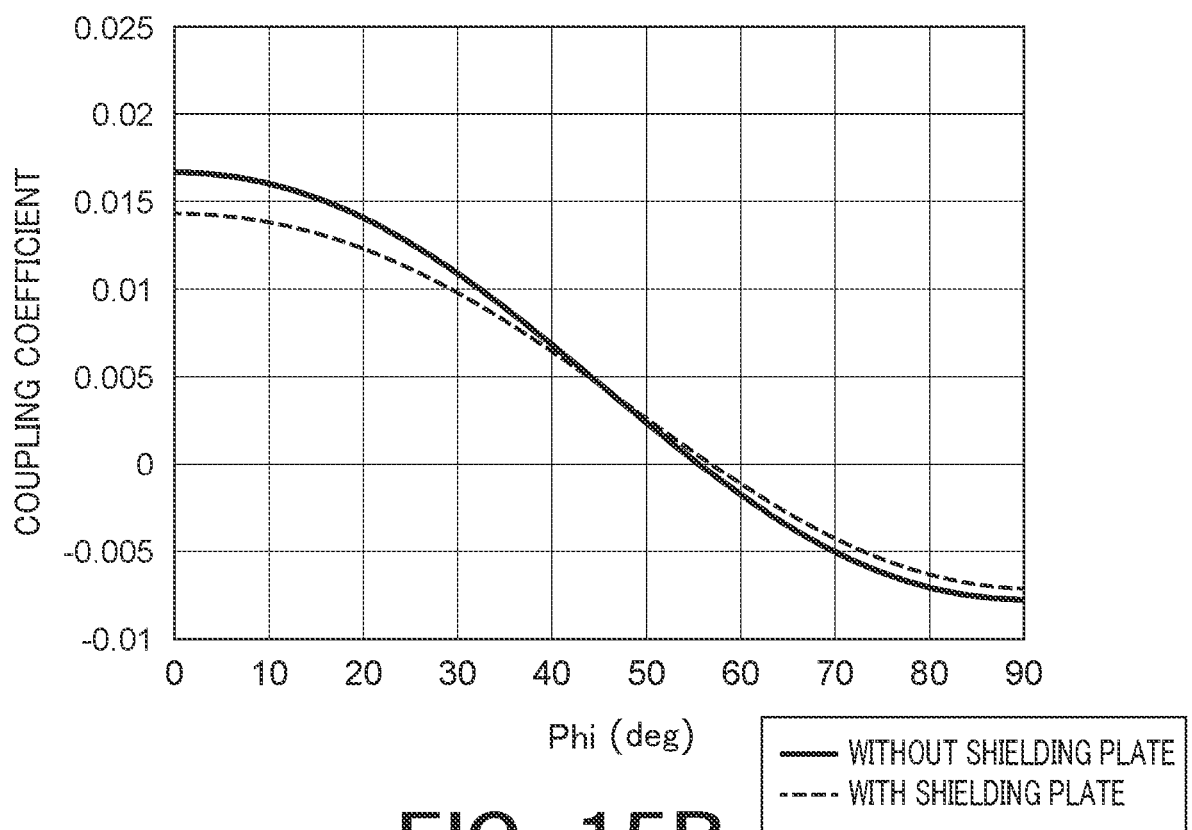
FIG. 15B is a graph illustrating the relationship between the coupling coefficient and the angle φ in the inductor unit of FIG. 15A.

FIG. 15B is a graph illustrating the relationship between the coupling coefficient and the angle ϕ in the inductor unit 100 of FIG. 15A. As illustrated in FIG. 15B, when the shielding plate 3 is provided in the inductor unit 100, the coupling coefficient can be decreased further by its shielding effect.

Figure 16:
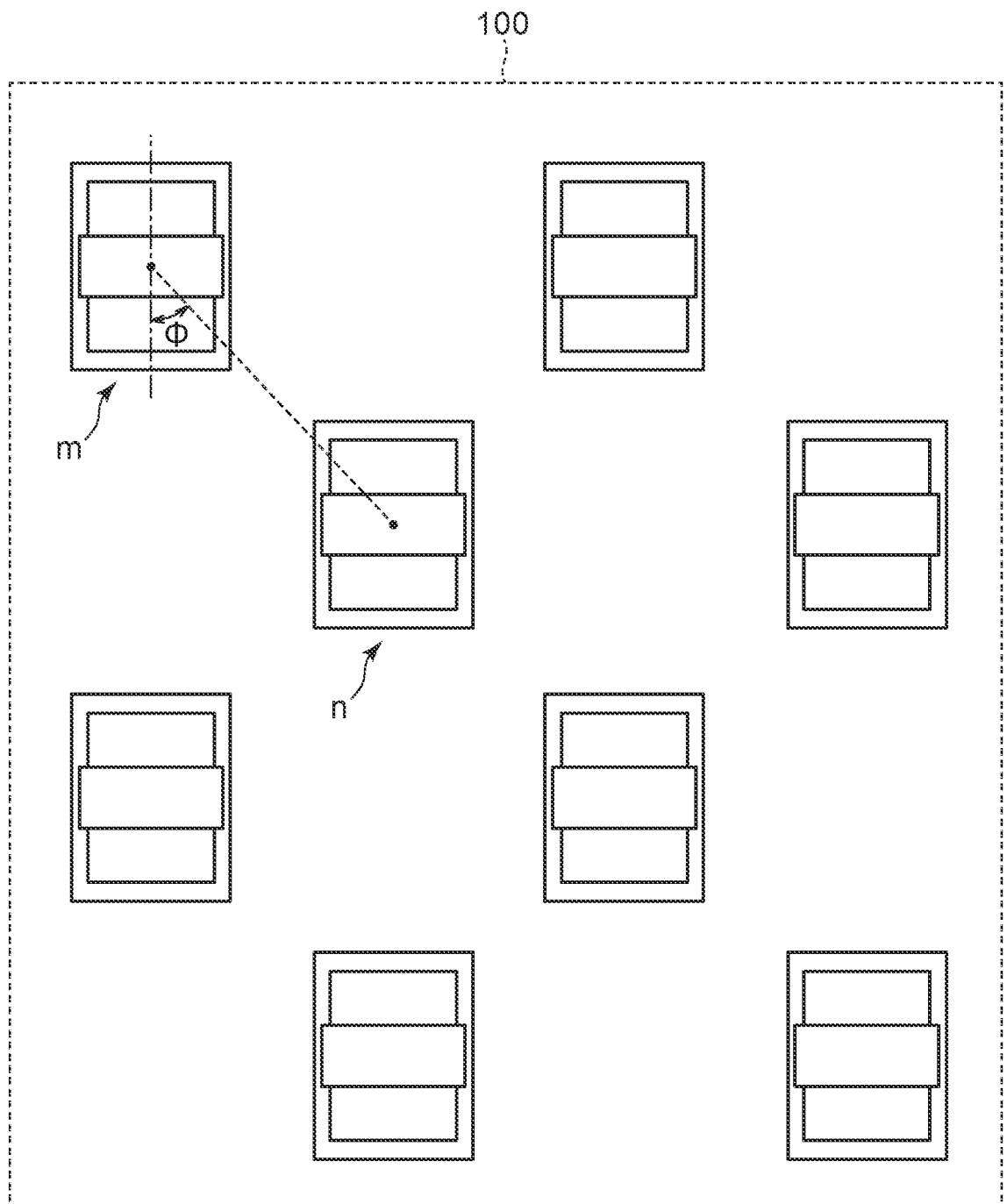
FIG. 16 is a plan view illustrating a modification example of the inductor unit of FIG. 1.

FIG. 16 is a plan view illustrating still another modification example of the inductor unit 100 according to this embodiment. The inductor unit 100 of FIG. 16 has N (N≥3) inductors. Among the N inductors, the n-th (1≤n≤N) inductor n is disposed so that the angle ϕ is larger than 0 degree and smaller than 90 degrees, preferably 50 degrees or more and 70 degrees or less, with respect to an inductor or inductors m (1≤m≤N, n≠m) disposed closely. That is, the group of inductors n, m disposed closely is disposed similarly to the above-described inductors 1, 2.

Here, the inductor m disposed closely to the inductor n means an inductor having a relatively larger coupling coefficient with respect to the inductor n compared to that of any other inductor. In general, the inductor m includes an inductor having a smallest distance to the inductor n but is not limited to this. By thus disposing the N inductors, it is possible to reduce the coupling coefficient between inductors even when there are three or more inductors.

Further, when the inductor unit 100 includes N inductors, the leakage magnetic field H can be reduced by generating a magnetic field having a phase difference of 360/N degrees in each inductor.

Moreover, when this inductor unit 100 is used as a power transmission device, a predetermined magnetic field is generated in an inductor to which no inductor on the power reception side is disposed opposite among the N inductors. Specifically, an inductor to which an inductor on the power reception side is disposed opposite generates a magnetic field for power transmission, and the inductor to which no inductor on the power reception side is disposed opposite generates the predetermined magnetic field. Thus, leakage of the magnetic field for power transmission can be suppressed. Note that the predetermined magnetic field is a magnetic field for suppressing leakage of the magnetic field for power transmission and improving transmission efficiency.

Second Embodiment

Next, a wireless power transmission device according to a second embodiment will be explained with reference to FIG. 17 to FIG. 23. The wireless power transmission device according to this embodiment has the inductor unit according to the first embodiment. The wireless power transmission device described here includes a power reception device and a power transmission device for wireless power transmission. Hereinafter, the power reception device and the power transmission device will be explained separately.

Figure 17:
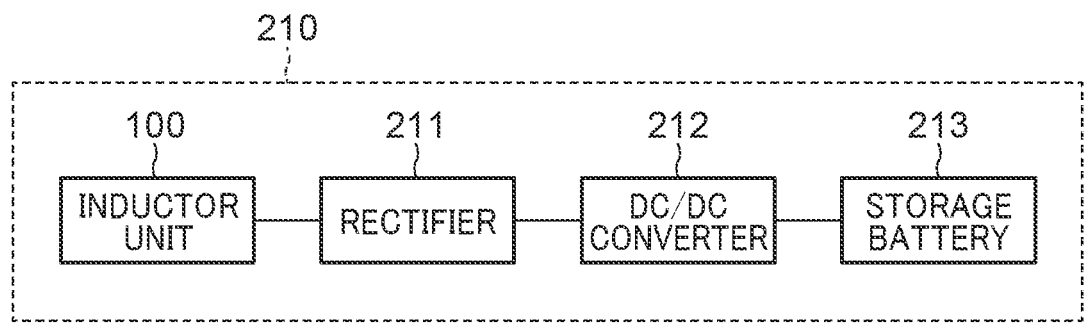
FIG. 17 is a block diagram illustrating a schematic structure of a power reception device according to a second embodiment.

FIG. 17 is a block diagram illustrating a schematic structure of a power reception device 210 according to this embodiment. The power reception device 210 has, as illustrated in FIG. 17, the inductor unit 100 according to the first embodiment, a rectifier 211, a DC/DC converter 212, and a storage battery 213.

The power reception device 210 receives power via the inductor unit 100 from the inductor on the power transmission side. The received power is inputted to the rectifier 211.

The rectifier 211 rectifies AC power inputted from the inductor unit 100 to DC power. The rectifier 211 is constituted of, for example, a bridge circuit using a diode. The power rectified by the rectifier 211 is inputted to the DC/DC converter 212.

The DC/DC converter 212 adjusts voltage so that an appropriate voltage is applied to the storage battery 213. The adjusted voltage is inputted to the storage battery 213. Note that the power reception device 210 can also be of a structure not having the DC/DC converter 212.

The storage battery 213 stores power inputted from the DC/DC converter 212 or the rectifier 211. As the storage battery 213, any storage battery such as a lead-acid battery or a lithium ion battery can be used.

This power reception device 210 receives power via the inductor unit 100. Thus, a magnetic coupling between the inductors on the power reception side during power reception is small, and decrease of power transmission efficiency is suppressed. Therefore, the storage battery 213 can be charged efficiently. Note that the power reception device 210 can also be of a structure not having the storage battery 213.

Figure 18:
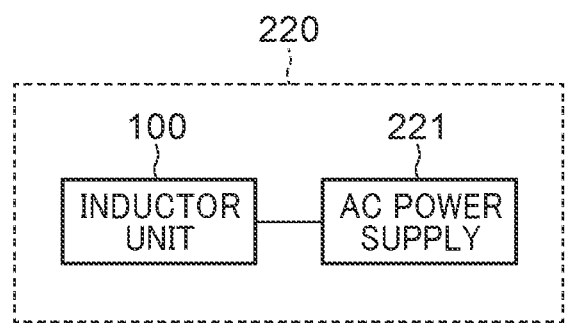
FIG. 18 is a block diagram illustrating a schematic structure of a power transmission device according to the second embodiment.

FIG. 18 is a block diagram illustrating a schematic structure of a power transmission device 220 according to this embodiment. The power transmission device 220 has, as illustrated in FIG. 18, the inductor unit 100 according to the first embodiment and an AC power supply 221.

The AC power supply 221 inputs AC power to the inductor unit 100. For example, the AC power supply 221, to which power is inputted from a commercial power supply, rectifies the inputted power and outputs AC power by using an inverter circuit. Further, the AC power supply 221 can also be structured to have a circuit adjusting voltage of commercial power, DC power, and AC power, and/or a power-factor improvement circuit called a PFC circuit. The inductors 1, 2 of the inductor unit 100 generate an AC magnetic field by the power inputted from the AC power supply 221 and transmit power to the inductor on the power reception side.

Figure 19:
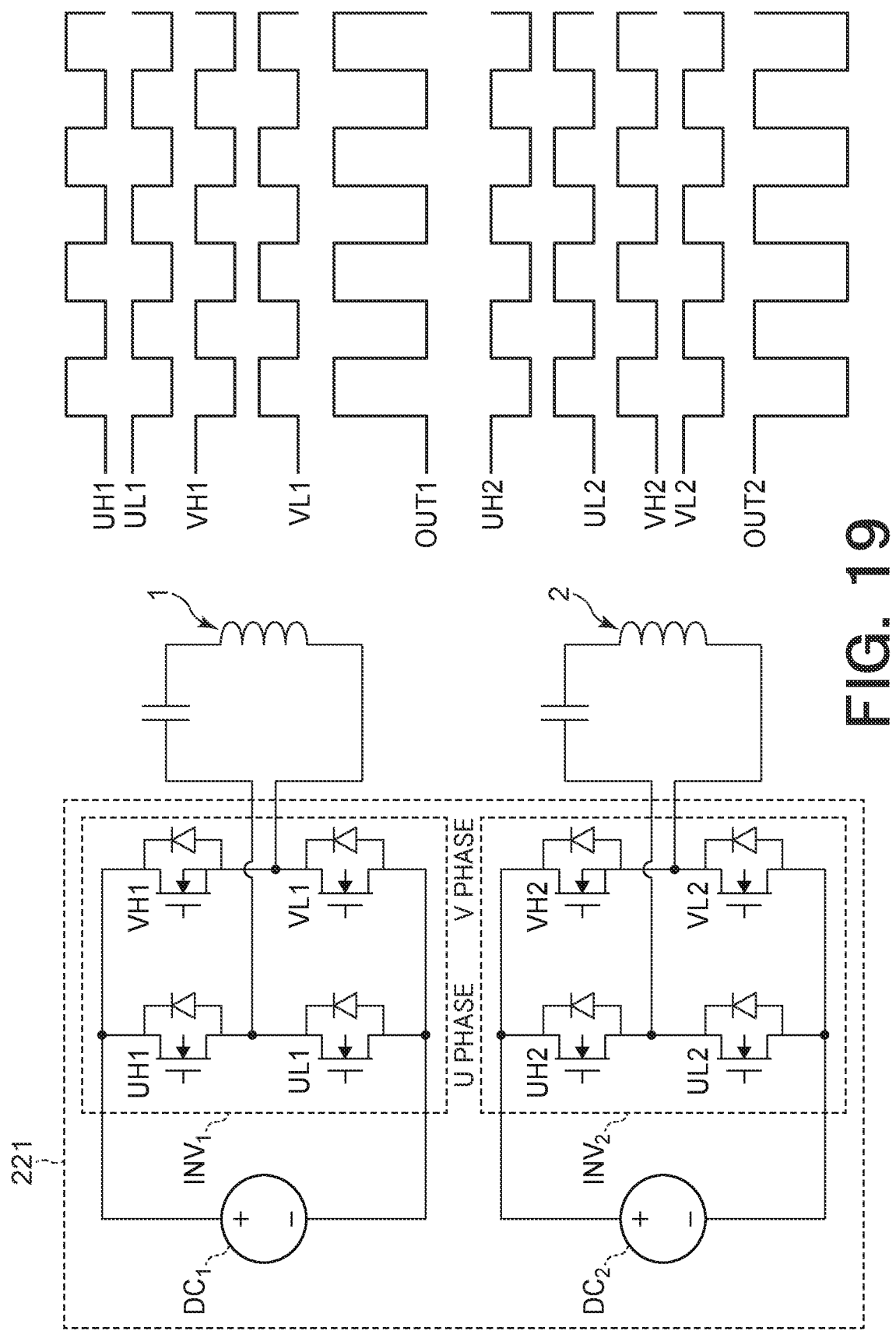
FIG. 19 is a circuit diagram illustrating an example of an AC power supply.

FIG. 19 is a circuit diagram illustrating an example of the AC power supply 221. In FIG. 19, the AC power supply 221 has a DC power supply $DC_1$ supplying power to the inductor 1, an inverter circuit $INV_1$ converting DC power supplied by the DC power supply $DC_1$ to AC, a DC power supply $DC_2$ supplying power to the inductor 2, and an inverter circuit $INV_2$ converting DC power supplied by the DC power supply $DC_2$ to AC.

The inverter circuits $INV_1$, $INV_2$ are single phase full bridge inverters. The inverter circuits $INV_1$, $INV_2$ drive a U-phase and a V-phase in reverse phase. Specifically, a transistor UH and a transistor VH are opened or closed in reverse phase, and a transistor UL and a transistor VL are opened or closed in reverse phase. Thus, the DC power is converted into the AC power.

In the case of the AC power supply 221 of FIG. 19, by driving the inverter circuit $INV_1$ and the inverter circuit $INV_2$ in reverse phase, magnetic fields generated by the inductors 1, 2 can be in reverse phase. Therefore, the leakage magnetic field H can be reduced. Note that in FIG. 19, OUT1, OUT2 represent phases of the magnetic fields generated by the inductors 1, 2.

Figure 20:
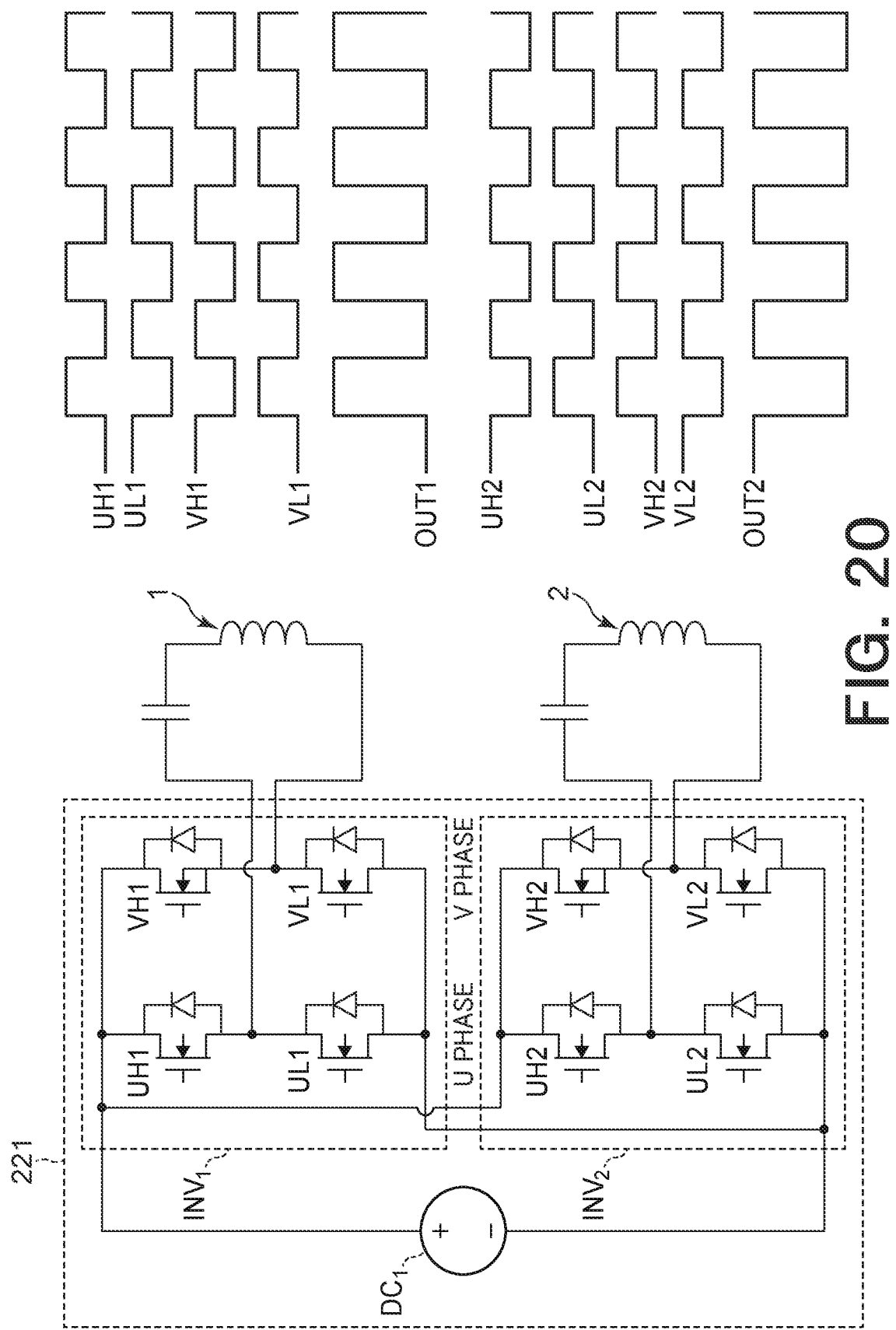
FIG. 20 is a circuit diagram illustrating an example of the AC power supply.

The AC power supply 221 may share two systems of DC power supplies $DC_1$, $DC_2$ and be formed of one system of DC power supply $DC_1$ as illustrated in FIG. 20. In FIG. 20, the inverter circuits $INV_1$, $INV_2$ are connected in parallel. In this AC power supply 221, by driving the inverter circuit $INV_1$ and the inverter circuit $INV_2$ in reverse phase similarly to FIG. 19, magnetic fields generated by the inductors 1, 2 can be in reverse phase.

Figure 21:
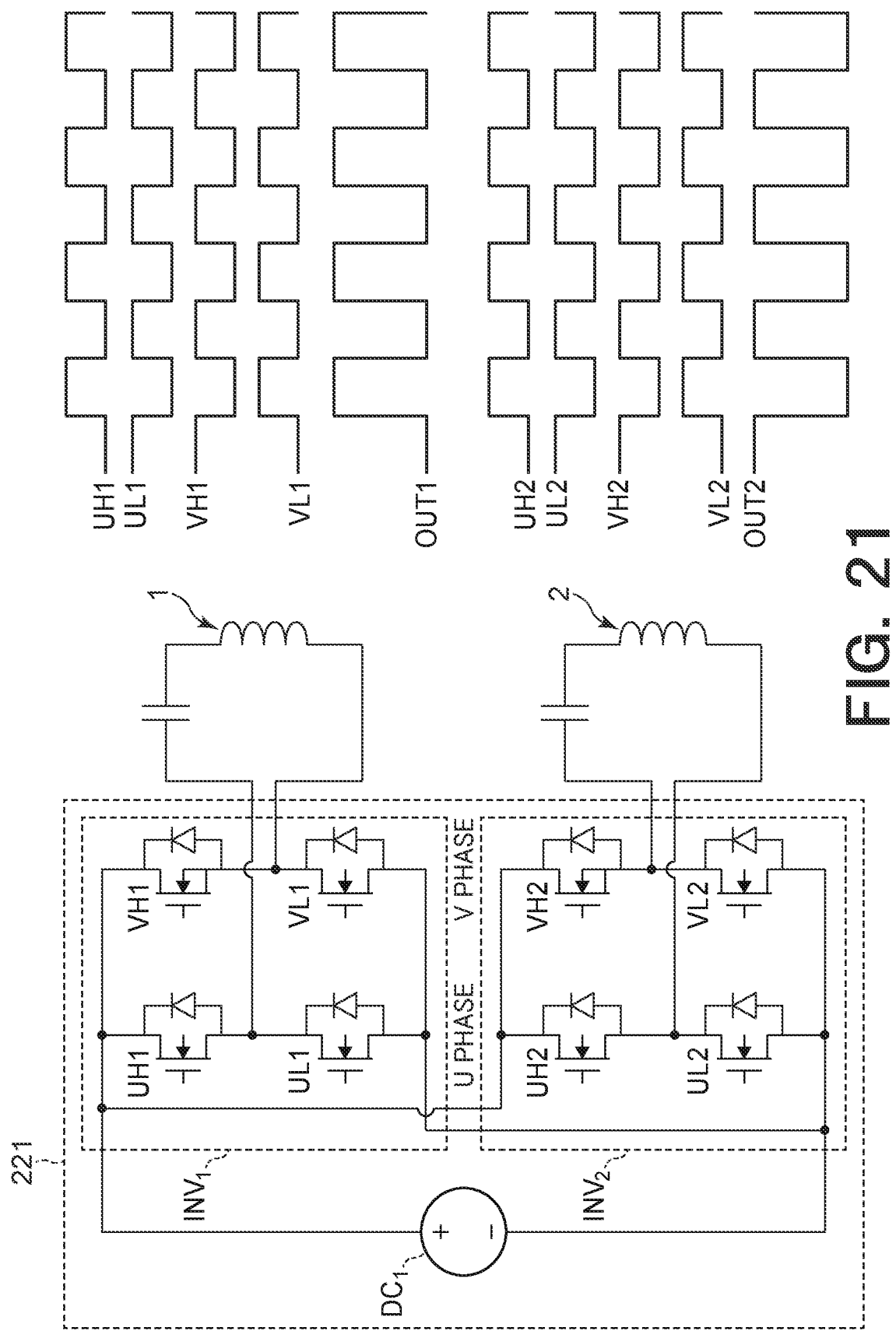
FIG. 21 is a circuit diagram illustrating an example of the AC power supply.

Further, as illustrated in FIG. 21, when the connection between the inverter circuit $INV_2$ and the inductor 2 are reverse to that in FIG. 20, magnetic fields generated by the inductors 1, 2 can be in reverse phase by driving the inverter circuit $INV_1$ and the inverter circuit $INV_2$ in phase.

Figure 22:
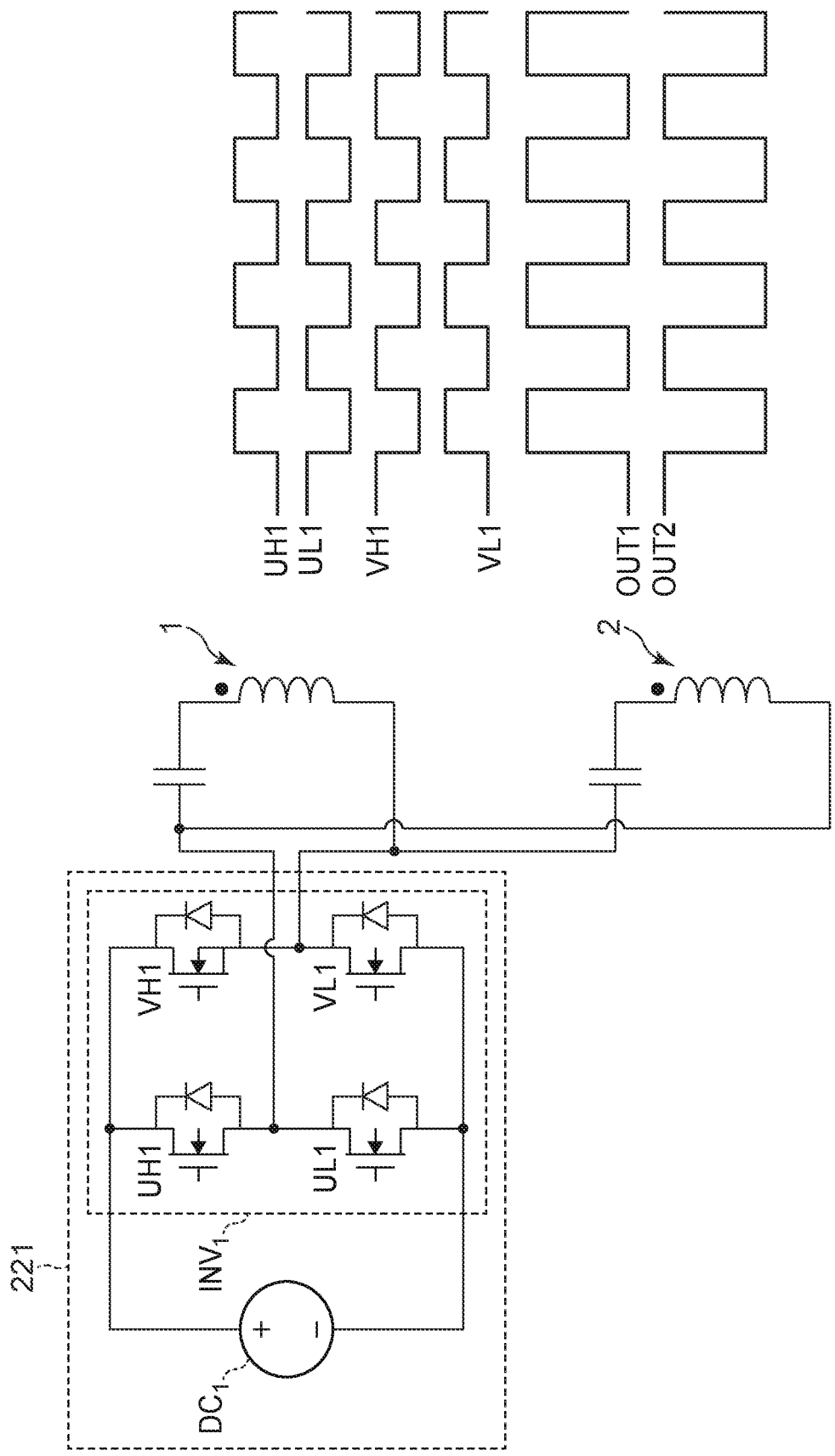
FIG. 22 is a circuit diagram illustrating an example of the AC power supply.
Figure 23:
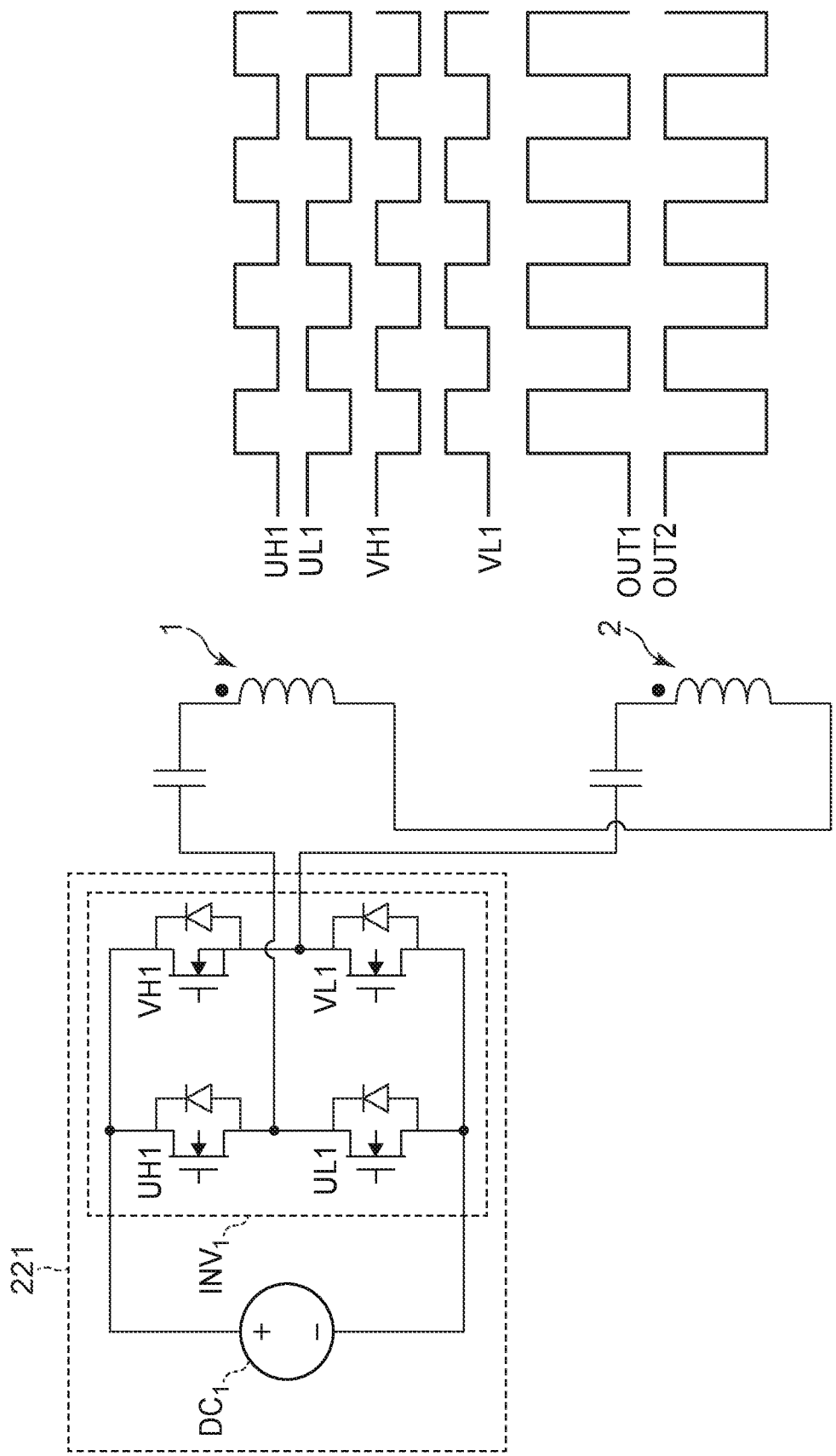
FIG. 23 is a circuit diagram illustrating an example of the AC power supply.

The AC power supply 221 may share two inverter circuits $INV_1$, $INV_2$ and be formed of one inverter circuit $INV_1$ as illustrated in FIG. 22. In FIG. 22, the inductors 1, 2 are connected in parallel so that their input directions are opposite. Further, the AC power supply 221 of FIG. 23 is formed of one inverter circuit $INV_1$ similarly to that of FIG. 22, and the inductors 1, 2 are connected in series so that their input directions are opposite. In these AC power supplies 221, driving of the inverter circuit $INV_1$ causes the inductors 1, 2 generate magnetic fields in reverse phase.

Note that the AC power supply 221 is not limited to the above structures, and can be of any structure capable of inputting AC power to the inductor unit 100.

Third Embodiment

Next, an electric vehicle according to a third embodiment will be explained with reference to FIG. 24 to FIG. 27. The electric vehicle according to this embodiment includes the wireless power transmission device according to the second embodiment as a power reception device. The electric vehicle here means a vehicle driven by electric power or by a combination of electric power and fuel. The electric vehicle includes an electric vehicle, an electric bus, PHEV (Plug-in Hybrid electric Vehicle), and a storage battery powered vehicle, and the like. The case where the electric vehicle is an electric bus will be explained below, but the electric vehicle according to this embodiment is not limited to this.

Figure 24:
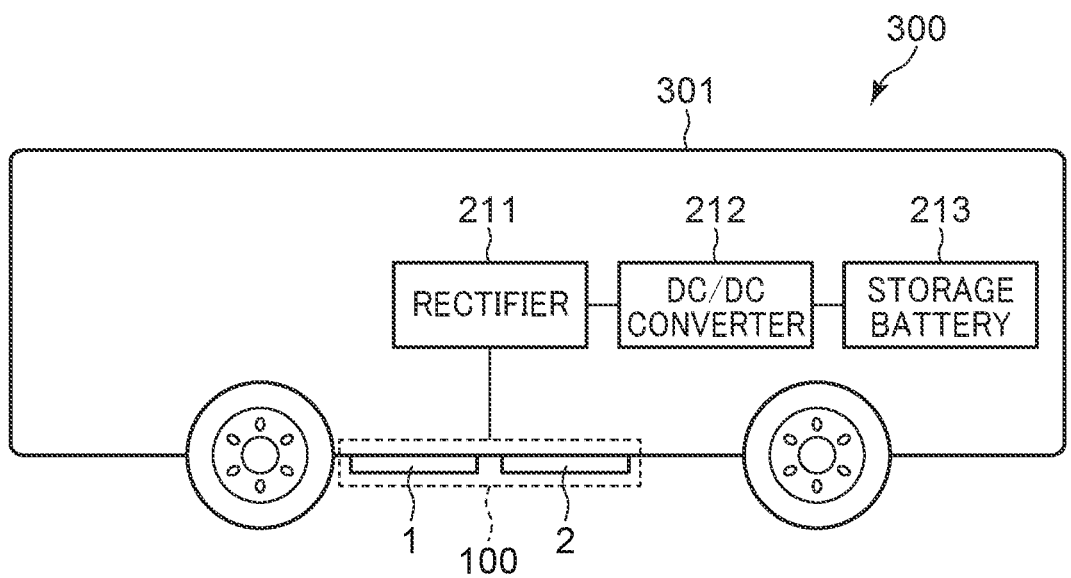
FIG. 24 is a schematic structure diagram illustrating an electric bus according to a third embodiment.

FIG. 24 is a schematic diagram illustrating an electric bus 300 according to this embodiment. As illustrated in FIG. 24, the electric bus 300 has an inductor unit 100, a rectifier 211, a DC/DC converter 212, a storage battery 213, and a vehicle body 301. The inductor unit 100, the rectifier 211, the DC/DC converter 212, and the storage battery 213 constitute the power reception device 210 in the second embodiment. The inductor unit 100 is provided on a bottom part of the vehicle body 301 so that surfaces of lower sides (road surface sides) of the inductors 1, 2 oppose the road surface.

This electric bus 300 is supplied with power from the wireless power transmission device on the power transmission side grounded on a road surface of a parking lot or the like, to have the storage battery 213 charged. The electric bus 300 is driven by power stored in the storage battery 213. The electric bus 300 receives power via the inductor unit 100. Thus, a magnetic coupling between the inductors on the power reception side when power is received becomes small, and decrease of power transmission efficiency is suppressed. Therefore, the storage battery 213 can be charged efficiently.

Figure 25:
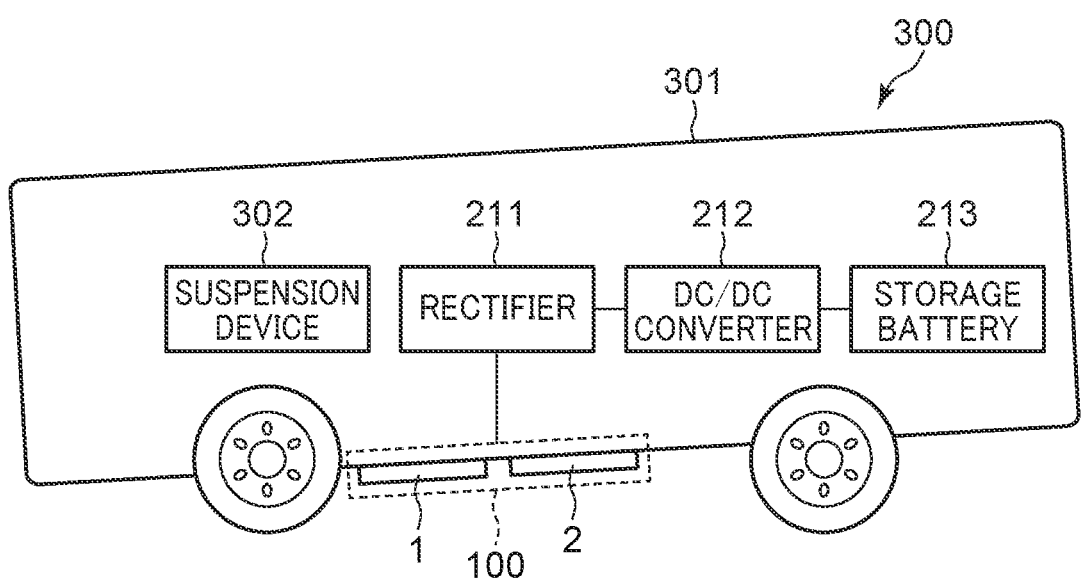
FIG. 25 is a schematic structure diagram illustrating a modification example of the electric bus according to the third embodiment.

FIG. 25 is a schematic diagram illustrating a modification example of the electric bus 300 according to this embodiment. This electric bus further has a suspension device 302. The suspension device 302 raises or lowers the vehicle height of at least one of a front side and a rear side of the vehicle body 301 of the electric bus 300. As the suspension device 302, for example, an air suspension is used. In this electric bus 300, by the suspension device 302 raising or lowering either the front side or the rear side of the vehicle body 301, a kneeling function to incline the vehicle body 301 is achieved. FIG. 25 illustrates the electric bus 300 during kneeling.

The inductors 1, 2 of this electric bus 300 can be made close to the road surface by lowering the vehicle height 301 by the suspension device 302. That is, the distance between the inductors 1, 2 on the power reception side and the inductor on the power transmission side grounded on the road surface can be made small. Therefore, transmission efficiency of wireless power transmission can be improved.

Further, as illustrated in FIG. 25, the inductors 1, 2 are preferred to be disposed on the bottom part of the vehicle body 301 on the side which lowers during kneeling. This can further shorten the distance between the inductors 1, 2 on the power reception side during kneeling and the inductor on power transmission side grounded on the road surface.

When the suspension device 302 is capable of raising or lowering the vehicle heights of the front side and the rear side of the vehicle body 301, both the inductors 1, 2 can be made evenly close to the road surface. Therefore, transmission efficiency of the inductors 1, 2 can be improved evenly.

However, when the suspension device 302 is capable of raising or lowering only one height of the front side or the rear side of the vehicle body 301, as illustrated in FIG. 25, the distance between the inductor 1 and the road surface would be different from the distance between the inductor 2 and the road surface. In this case, transmission efficiency of the inductor 2 at a larger distance from the road surface is lower than transmission efficiency of the inductor 1 at a smaller distance from the road surface.

Figure 26:
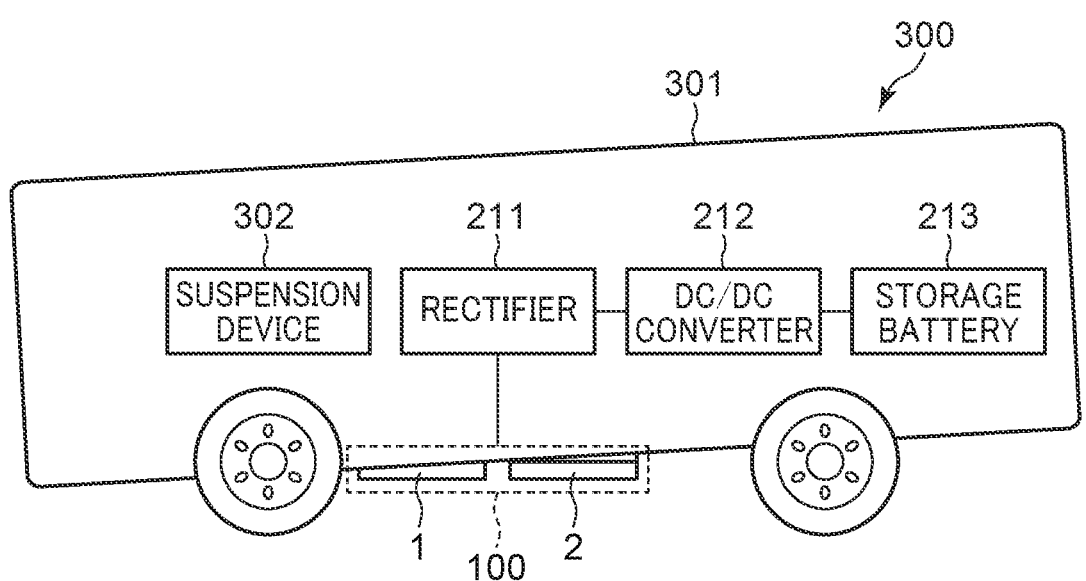
FIG. 26 is a schematic structure diagram illustrating a modification example of the electric bus according to the third embodiment.

In this case, the inductors 1, 2 are preferred to be disposed so that the distance from the inductor 1 to the road surface and the distance from the inductor 2 to the road surface during kneeling are equal as illustrated in FIG. 26. Thus, transmission efficiency of the inductors 1, 2 can be improved evenly.

Figure 27:
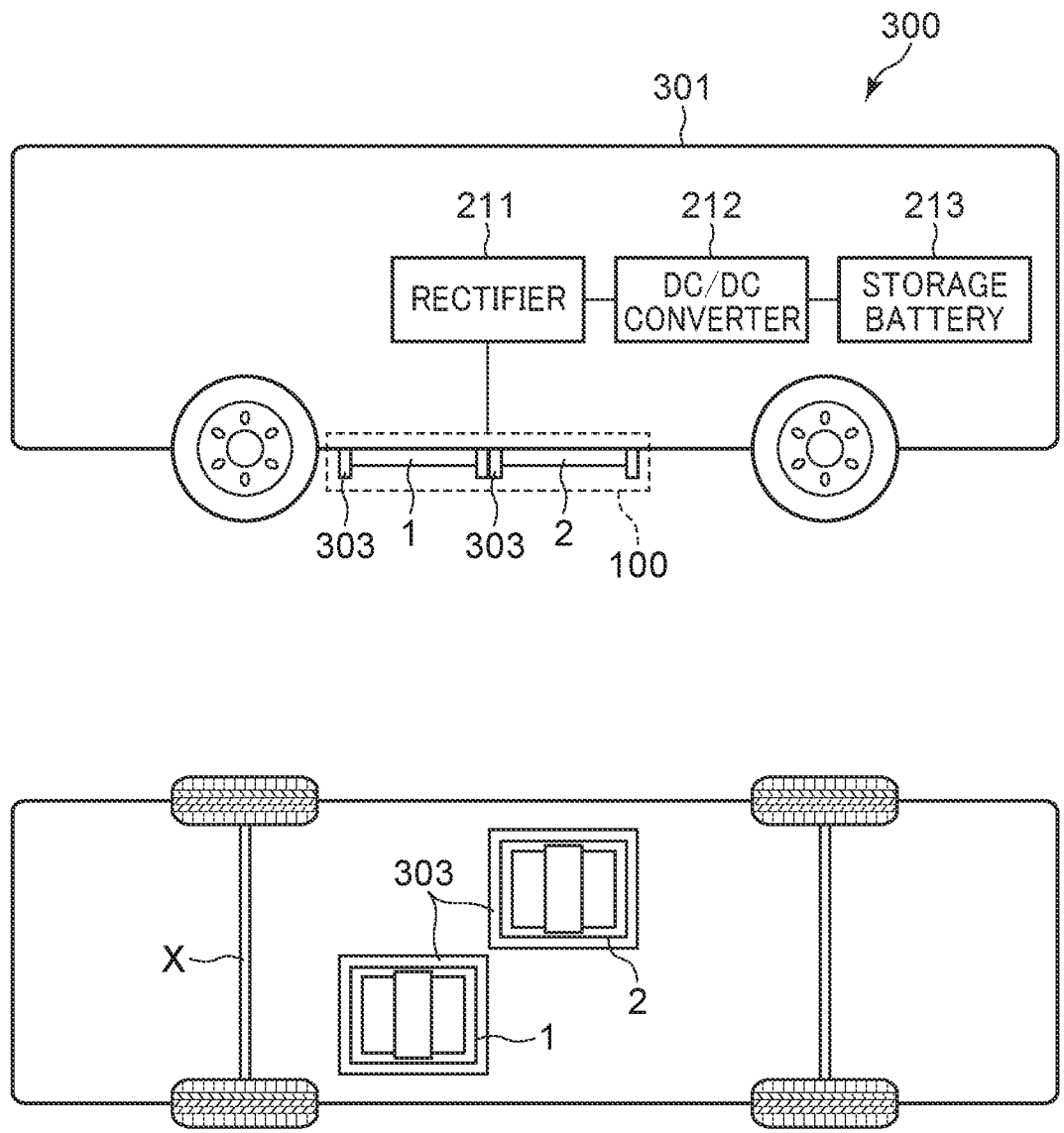
FIG. 27 is a schematic structure diagram illustrating a modification example of the electric bus according to the third embodiment.

FIG. 27 is a schematic diagram illustrating a modification example of the electric bus 300 according to this embodiment. The electric bus 300 of FIG. 27 further has a vehicle body frame 303. The vehicle body frame 303 is provided on the bottom part of the vehicle body 301 so as to surround at least part of the inductors 1, 2. The vehicle body frame 303 is formed to project toward the road surface side from the surfaces of the lower sides (road surface sides) of the inductors 1, 2.

With such a structure, when the bottom part of the vehicle body 301 comes in contact with the road surface, the vehicle body frame 303 projecting toward the road surface side can protect the inductors 1, 2. Further, the vehicle body frame 303 can be formed of a conductor or a magnetic substance to be used as the shielding plate 3.

It should be noted that the present invention is not limited to the above-described embodiments as they are, and can be embodied with modified components within the range not departing from the spirit thereof in the implementation stage. Further, various inventions can be formed by appropriately combining a plurality of components disclosed in the embodiments. Furthermore, for example, structures in which several components are deleted from all the components described in the respective embodiments are also conceivable. Moreover, components described in different embodiments may be combined appropriately.

It should be noted that the present invention is not limited to the above-described respective embodiments as they are, but may be embodied with components being modified in a range not departing from the contents thereof at the stage of implementation. Further, various inventions can be formed by appropriately combining a plurality of components disclosed in the above-described respective embodiments. Further, for example, there can be considered a configuration in which some of all the components shown in the respective embodiments are deleted. Further, components described in different embodiments can be combined appropriately.

The invention claimed is:

1. A wireless power transmission system comprising a wireless power transmitter and a wireless power receiver,
    wherein the wireless power transmitter comprises:
        (1) a first inductor comprising a first core and a first winding wound around the first core and configured to provide a first magnetic flux in accordance with a first current flow of the first winding to transmit power to the wireless power receiver; and
        (2) a second inductor comprising a second core and a second winding wound around the second core and configured to provide a second magnetic flux in accordance with a second current flow of the second winding to transmit power to the wireless power receiver,
    wherein a first center line of the first core in parallel with a direction of the first magnetic flux in the first inductor and a second center line of the second core in parallel with a direction of the second magnetic flux in the second inductor are substantially in parallel, and a phase of the first magnetic flux and a phase of the second magnetic flux are substantially in opposite phase,
    wherein a wireless power receiver comprises:
        (3) a third inductor comprising a third core and a third winding wound around the third core and configured to receive at least part of the first magnetic flux; and
        (4) a fourth inductor comprising a fourth core and a fourth winding wound around the fourth core and configured to receive at least part of the second magnetic flux,
    wherein a third center line of the third core in parallel with a direction of a received magnetic flux in the third inductor and a fourth center line of the fourth core in parallel with a direction of a received magnetic flux in the fourth inductor are substantially in parallel, the first core and the third core face each other, and the second core and the fourth core face each other,
    wherein the first inductor and the second inductor are disposed so that a first angle is larger than 50 degrees and smaller than 70 degrees to decrease a coupling coefficient of the first inductor and the second inductor, and
    the first angle is formed by:
        a first straight line passing through (1) a first intersection point of the first center line and a fifth center line of the first core perpendicular to the direction of the first magnetic flux, and (2) a second intersection point of the second center line and a sixth center line of the second core perpendicular to the direction of the second magnetic flux; and the first center line,
wherein the third inductor and the fourth inductor are disposed so that a second angle is larger than 50 degrees and smaller than 70 degrees to decrease a coupling coefficient of the third inductor and the fourth inductor, and
the second angle is formed by:
- a second straight line passing through (1) a third intersection point of the third center line and a seventh center line of the third core perpendicular to the third center line, and (2) a fourth intersection point of the fourth center line and an eighth center line of the fourth core perpendicular to the fourth center line; and
- the third center line.

2. The wireless power transmission system according to claim 1, wherein a direction of winding the first winding and a direction of winding the second winding are substantially opposite directions.

3. The wireless power transmission system according to claim 1, wherein a phase of the first current flow and a phase of the second current flow are substantially in reverse phase.

4. The wireless power transmission system according to claim 1, wherein a current flowing through the first winding and a current flowing through the second winding are substantially in opposite directions.

5. The wireless power transmission system according to claim 1, wherein the first winding is wound so that a seventh center line perpendicular to the first magnetic flux direction of the first winding is separated from the fifth center line.

6. The wireless power transmission system according to claim 1, further comprising a shielding plate which is a conductor or a magnetic substance and disposed between the first inductor and the second inductor.

7. The wireless power transmission system according to claim 1, comprising N (N≥3) inductors including the first inductor and the second inductor, wherein the second inductor is an inductor disposed close to the first inductor among the N inductors.

8. The wireless power transmission system according to claim 7, wherein, during power transmission,
a busy inductor among the N inductors is disposed opposite to an inductor on a power reception side,
an idle inductor among the N inductors is not disposed to any inductors on the power reception side,
the busy inductor generates a magnetic field for the power transmission, and
the idle inductor generates a predetermined magnetic field for suppressing leakage of the magnetic field for the power transmission.

9. An electric vehicle comprising the wireless power receiver of the wireless power transmission system according to claim 1 on a bottom part of a vehicle body.

10. The electric vehicle according to claim 9, further comprising a suspension device which raises or lowers the vehicle body, wherein the wireless power receiver is disposed on a bottom part of the vehicle body on a side which is lowered by the suspension device.

11. The electric vehicle according to claim 10, wherein, when the vehicle body has been raised or lowered, the third inductor and the fourth inductor of the wireless power transmitter are disposed so that a distance from the third inductor to a road surface and a distance from the fourth inductor to the road surface are equal.

12. The electric vehicle according to claim 9, further comprising a vehicle body frame on a bottom part of the vehicle body, the vehicle body frame projecting downward from the third inductor and the fourth inductor of the wireless power receiver.

13. The wireless power transmission system according to claim 1, wherein a coupling coefficient of the first inductor and the second inductor is substantially 0.

14. The wireless power transmission system according to claim 1, wherein a coupling coefficient of the first inductor and the second inductor is close to 0.

15. The wireless power transmission system according to claim 1, further comprising
a first region which is a peripheral region of a fifth intersection point of the fifth center line and the third center line, no inductor being provided in the first region; and
a second region which is a peripheral region of a sixth intersection point of the first center line and the sixth center line, no inductor being provided in the second region.

16. A wireless power transmission system comprising a wireless power transmitter and a wireless power receiver,
wherein the wireless power transmitter comprises at least N (N≥3) inductors including:
(1) a first inductor comprising a first core and a first winding wound around the first core and configured to provide a first magnetic flux in accordance with a first current flow of the first winding to transmit power to the wireless power receiver; and
(2) a second inductor comprising a second core and a second winding wound around the second core and configured to provide a second magnetic flux in accordance with a second current flow of the second winding to transmit power to the wireless power receiver,
wherein a first center line of the first core in parallel with a direction of a first magnetic flux in the first inductor and a second center line of the second core in parallel with a direction of a second magnetic flux in the second inductor are substantially in parallel, and a difference between a phase of the first magnetic flux and a phase of the second magnetic flux are substantially 360/N degrees, and the second inductor is an inductor disposed close to the first inductor among the N inductors,
wherein a wireless power receiver comprises:
(3) a third inductor comprising a third core and a third winding wound around the third core and configured to receive at least part of the first magnetic flux; and
(4) a fourth inductor comprising a fourth core and a fourth winding wound around the fourth core and configured to receive at least part of the second magnetic flux,
wherein a third center line of the third core in parallel with a direction of a received magnetic flux in the third inductor and a fourth center line of the fourth core in parallel with a direction of a received magnetic flux in the fourth inductor are substantially in parallel, the first core and the third core face each other, and the second core and the fourth core face each other,
wherein the first inductor and the second inductor are disposed so that a first angle is larger than 50 degrees and smaller than 70 degrees to decrease a coupling coefficient of the first inductor and the second inductor, and
the first angle is formed by:

a first straight line passing through (1) a first intersection point of the first center line and a fifth center line of the first core perpendicular to the direction of the first magnetic flux, and (2) a second intersection point of the second center line and a sixth center line of the second core perpendicular to the direction of the second magnetic flux; and the first center line, wherein the third inductor and the fourth inductor are disposed so that a second angle is larger than 50 degrees and smaller than 70 degrees to decrease a coupling coefficient of the third inductor and the fourth inductor, and the second angle is formed by:
- a second straight line passing through (1) a third intersection point of the third center line and a seventh center line of the third core perpendicular to the third center line, and (2) a fourth intersection point of the fourth center line and a eight center line of the fourth core perpendicular to the fourth center line; and
- the third center line.

17. A wireless power transmission system capable of transmitting power wirelessly to a wireless power receiver, comprising:
- a first inductor comprising a first core and a first winding wound around the first core and configured to provide a first magnetic flux in accordance with a first current flow of the first winding to transmit power to an inductor of the wireless power receiver; and
- a second inductor comprising a second core and a second winding wound around the second core and configured to provide a second magnetic flux in accordance with a second current flow of the second winding to transmit power to an inductor of the wireless power receiver,
wherein a first center line of the first core in parallel with a direction of a first magnetic flux in the first inductor and a second center line of the second core in parallel with a direction of a second magnetic flux in the second inductor are substantially in parallel, and a phase of the first magnetic flux and a phase of the second magnetic flux are substantially in opposite phase,
wherein the first inductor and the second inductor are disposed so that a first angle is larger than 50 degrees and smaller than 70 degrees to decrease a coupling coefficient of the first inductor and the second inductor, and
the first angle is formed by:
- a first straight line passing through (1) a first intersection point of the first center line and a fifth center line of the first core perpendicular to the direction of the first magnetic flux, and (2) a second intersection point of the second center line and a sixth center line of the second core perpendicular to the direction of the second magnetic flux; and
- the first center line.

18. A wireless power transmission system capable of transmitting power wirelessly to a wireless power receiver, comprising:
- at least N (N≥3) inductors including (1) a first inductor comprising a first core and a first winding wound around the first core and configured to provide a first magnetic flux in accordance with a first current flow of the first winding to transmit power to an inductor of the wireless power receiver, and (2) a second inductor comprising a second core and a second winding wound around the second core and configured to provide a second magnetic flux in accordance with a second current flow of the second winding to transmit power to an inductor of the wireless power receiver,
wherein a first center line of the first core in parallel with a direction of a first magnetic flux in the first inductor and a second center line of the second core in parallel with a direction of a second magnetic flux in the second inductor are substantially in parallel, a difference between a phase of the first magnetic flux and a phase of the second magnetic flux are substantially 360/N degrees, and the second inductor is an inductor disposed closest to the first inductor among the N inductors,
wherein the first inductor and the second inductor are disposed so that a first angle is larger than 50 degrees and smaller than 70 degrees to decrease a coupling coefficient of the first inductor and the second inductor, and
the first angle is formed by:
- a first straight line passing through (1) a first intersection point of the first center line and a fifth center line of the first core perpendicular to the direction of the first magnetic flux, and (2) a second intersection point of the second center line and a sixth center line of the second core perpendicular to the direction of the second magnetic flux; and
- the first center line.

* * * * *